United States Patent
Cunningham

(10) Patent No.: US 9,655,305 B2
(45) Date of Patent: May 23, 2017

(54) CUTTING TOOL WITH A VARIABLE PIVOT SYSTEM

(71) Applicant: Fiskars Brands, Inc., Madison, WI (US)

(72) Inventor: Daniel Cunningham, Fitchburg, WI (US)

(73) Assignee: Fiskars Brands, Inc., Middleton, WI (US)

( * ) Notice: Subject to any disclaimer, the term of this patent is extended or adjusted under 35 U.S.C. 154(b) by 0 days.

(21) Appl. No.: 15/131,724

(22) Filed: Apr. 18, 2016

(65) Prior Publication Data

US 2016/0227709 A1    Aug. 11, 2016

Related U.S. Application Data

(62) Division of application No. 14/538,130, filed on Nov. 11, 2014, now Pat. No. 9,345,200.

(60) Provisional application No. 61/906,754, filed on Nov. 20, 2013.

(51) Int. Cl.
*A01G 3/02* (2006.01)
*A01G 3/025* (2006.01)

(52) U.S. Cl.
CPC .............. *A01G 3/0251* (2013.01); *A01G 3/02* (2013.01); *A01G 3/021* (2013.01); *Y10T 83/04* (2015.04)

(58) Field of Classification Search
CPC ......... B26B 13/26; B26B 17/02; A01G 3/025; A01G 3/0251

USPC ......... 30/192, 211, 244, 245, 250, 252, 254, 30/341, 342, 351; 81/348, 359, 360, 364, 81/366; 7/129–134; D8/5
See application file for complete search history.

(56) References Cited

U.S. PATENT DOCUMENTS

| | | |
|---|---|---|
| 46,960 A | 3/1865 | Wallis et al. |
| 65,745 A | 6/1867 | Heath |
| 103,873 A | 6/1870 | Grover |
| 107,577 A * | 9/1870 | Will ............... B23D 29/023 30/250 |

(Continued)

FOREIGN PATENT DOCUMENTS

| AU | 2002358825 A1 | 10/2003 |
|---|---|---|
| DE | 559786 C | 9/1932 |

(Continued)

OTHER PUBLICATIONS

International Preliminary Report on Patentability, PCT/US2014/065077, Fiskars Brands, Inc., 9 pages (May 24, 2016).

(Continued)

*Primary Examiner* — Jason Daniel Prone
(74) *Attorney, Agent, or Firm* — Foley & Lardner LLP

(57) ABSTRACT

A hand operated cutting tool includes a first handle coupled to a first cutting member, wherein the first handle has a first set of projections. The hand operated cutting tool also includes a second handle coupled to a second cutting member, wherein the second handle has a second set of projections. The handles are movable between a full open position and a full closed position, wherein during a first region of travel proximate the full open position the first and second gear projections are at least partly engaged, and wherein during a second region of travel proximate the full closed position the first and second gear projections are disengaged.

23 Claims, 25 Drawing Sheets

(56) References Cited

U.S. PATENT DOCUMENTS

| | | | | |
|---|---|---|---|---|
| 148,566 A * | 3/1874 | Kennedy | ............... | B26B 17/02 30/192 |
| 157,610 A * | 12/1874 | King | ............... | B26B 17/02 30/192 |
| 246,399 A * | 8/1881 | Layman | ............... | B23D 29/023 30/250 |
| 303,067 A * | 8/1884 | Stokes | ............... | B26B 17/02 30/192 |
| 328,288 A * | 10/1885 | Chase | ............... | B65B 13/345 30/192 |
| 351,339 A * | 10/1886 | Pullman | ............... | B26B 17/02 30/192 |
| 397,698 A * | 2/1889 | Cooper | ............... | B23D 29/023 30/250 |
| 433,914 A * | 8/1890 | Stokes et al. | ............... | B26B 17/02 30/192 |
| 444,635 A * | 1/1891 | Helwig | ............... | B26B 17/02 30/192 |
| 460,705 A | 10/1891 | Hansen | | |
| 476,459 A * | 6/1892 | Hamann et al. | ............... | B26B 13/26 30/192 |
| 508,022 A * | 11/1893 | Kamphaus | ............... | B23D 29/023 30/250 |
| 512,086 A * | 1/1894 | Ashcraft | ............... | B25B 7/14 30/250 |
| 542,435 A * | 7/1895 | Blumer | ............... | B26B 13/22 30/250 |
| 547,101 A * | 10/1895 | Williams | ............... | B26B 17/02 30/192 |
| 563,458 A | 7/1896 | Dillenbach | | |
| 573,548 A * | 12/1896 | Sours | ............... | B26B 17/02 30/192 |
| 633,588 A * | 9/1899 | Helwig | ............... | B23D 15/145 30/192 |
| 640,257 A * | 1/1900 | Baer | ............... | A01G 3/025 30/192 |
| 694,829 A | 3/1902 | Candlish | | |
| 766,298 A * | 8/1904 | Voellner et al. | ............... | B26B 29/04 30/250 |
| 767,344 A | 8/1904 | Jackson | | |
| 823,367 A * | 6/1906 | Ryan | ............... | B25B 7/12 30/192 |
| 823,816 A * | 6/1906 | Spragg | ............... | B26B 17/02 30/192 |
| 860,815 A | 7/1907 | Loock | | |
| 863,111 A * | 8/1907 | Smohl | ............... | B26B 17/02 30/192 |
| 883,457 A * | 3/1908 | Geis | ............... | B23D 29/023 30/250 |
| 906,950 A * | 12/1908 | Smith | ............... | A01G 3/025 30/245 |
| 1,065,753 A | 6/1913 | Whitney | | |
| 1,066,675 A | 7/1913 | Stowell | | |
| 1,105,191 A | 7/1914 | Flora et al. | | |
| 1,168,125 A | 1/1916 | Stowell | | |
| 1,181,072 A | 4/1916 | Gibson | | |
| 1,201,991 A | 10/1916 | Thurston | | |
| 1,284,351 A * | 11/1918 | Jagielo | ............... | F16B 7/105 30/259 |
| 1,304,917 A * | 5/1919 | Stauffer | ............... | A01G 3/065 30/192 |
| 1,368,077 A * | 2/1921 | Underwood | ............... | B23D 29/026 30/250 |
| 1,395,758 A * | 11/1921 | Maszczyk | ............... | B23D 29/026 30/250 |
| 1,429,792 A | 9/1922 | Stiriss | | |
| 1,430,705 A * | 10/1922 | Wagenbach | ............... | B23D 29/023 30/250 |
| 1,455,297 A | 5/1923 | Lyons et al. | | |
| 1,469,467 A * | 10/1923 | Wagenbach | ............... | B23D 17/08 30/250 |
| 1,502,191 A | 7/1924 | Helwig | | |
| 1,576,882 A * | 3/1926 | Voleske | ............... | H02G 1/005 30/250 |
| 1,689,648 A | 10/1928 | Voleske | | |
| 1,712,800 A | 5/1929 | Mottinger et al. | | |
| 1,715,898 A * | 6/1929 | Carri | ............... | B26B 13/00 30/252 |
| 1,760,627 A | 5/1930 | Bernard | | |
| 1,836,967 A * | 12/1931 | Helwig | ............... | B23D 29/023 30/192 |
| 1,897,532 A | 2/1933 | Pilcher | | |
| 1,915,404 A | 6/1933 | Clifton | | |
| 1,978,557 A * | 10/1934 | Turner et al. | ............... | B27G 5/04 30/250 |
| 2,084,633 A * | 6/1937 | Erickson | ............... | B25B 7/02 30/250 |
| 2,437,432 A * | 3/1948 | Martines | ............... | B23D 29/023 30/252 |
| 2,500,461 A | 3/1950 | Lazzarini | | |
| 2,500,462 A | 3/1950 | Lazzarini | | |
| 2,660,783 A * | 12/1953 | Davis et al. | ............... | B25B 7/12 30/252 |
| 2,939,211 A * | 6/1960 | Daniels | ............... | B26B 17/02 30/245 |
| 3,210,844 A | 10/1965 | Tontscheff | | |
| 3,230,756 A | 1/1966 | Pearson | | |
| 3,486,227 A | 12/1969 | Somervell | | |
| 3,885,309 A * | 5/1975 | Lund | ............... | B23D 29/023 30/250 |
| 4,050,153 A * | 9/1977 | Flisch | ............... | B23D 29/023 30/250 |
| 4,130,938 A | 12/1978 | Uhlmann | | |
| 4,178,682 A | 12/1979 | Sadauskas | | |
| 4,277,887 A | 7/1981 | Rady | | |
| 4,378,636 A * | 4/1983 | Wick | ............... | B23D 23/00 30/250 |
| 4,599,795 A | 7/1986 | Yokoyama | | |
| 4,677,748 A * | 7/1987 | Kobayashi | ............... | H02G 1/005 30/192 |
| 4,779,342 A * | 10/1988 | Kobayashi | ............... | B23D 29/023 30/192 |
| 5,060,381 A * | 10/1991 | Taberlet | ............... | B26B 13/24 30/194 |
| 5,168,629 A * | 12/1992 | Willard | ............... | B25G 1/102 30/254 |
| 5,184,404 A * | 2/1993 | Chen | ............... | B23D 29/023 30/250 |
| 5,325,592 A | 7/1994 | Linden et al. | | |
| 5,341,573 A | 8/1994 | Linden et al. | | |
| 5,426,857 A | 6/1995 | Linden | | |
| D368,634 S | 4/1996 | Frazer | | |
| 5,544,416 A | 8/1996 | Lin | | |
| 5,570,510 A | 11/1996 | Linden | | |
| 5,689,888 A | 11/1997 | Linden | | |
| 6,105,257 A | 8/2000 | Rutkowski et al. | | |
| D434,286 S | 11/2000 | Lin | | |
| 6,161,291 A | 12/2000 | DiMatteo et al. | | |
| D437,751 S | 2/2001 | Lin | | |
| 6,345,446 B1 | 2/2002 | Huang | | |
| 6,393,703 B1 * | 5/2002 | Wu | ............... | A01G 3/02 30/341 |
| 6,789,324 B2 | 9/2004 | Linden et al. | | |
| 6,829,829 B1 | 12/2004 | Huang | | |
| 6,935,031 B1 * | 8/2005 | Huang | ............... | B26B 13/26 30/250 |
| 6,938,346 B1 * | 9/2005 | Huang | ............... | B26B 13/26 30/250 |
| 6,966,115 B2 * | 11/2005 | Deville | ............... | A01G 3/02 30/250 |
| 7,347,125 B1 | 3/2008 | Juieng | | |
| 7,530,172 B1 | 5/2009 | Wu | | |
| D620,771 S | 8/2010 | Goetz et al. | | |
| D621,234 S | 8/2010 | Goetz et al. | | |
| D634,994 S | 3/2011 | Huang | | |
| D634,995 S | 3/2011 | Huang | | |
| D638,674 S | 5/2011 | Huang | | |
| D638,675 S | 5/2011 | Huang | | |
| D638,676 S | 5/2011 | Huang | | |

(56) References Cited

U.S. PATENT DOCUMENTS

| | | | |
|---|---|---|---|
| 7,946,039 B2 | 5/2011 | Erbrick | |
| 7,966,735 B1 * | 6/2011 | Hayes | B25F 1/003 30/254 |
| D649,420 S * | 11/2011 | Cunningham | D8/5 |
| 8,046,924 B2 | 11/2011 | Block et al. | |
| D652,277 S * | 1/2012 | Cunningham | D8/5 |
| 8,136,252 B2 | 3/2012 | Linden et al. | |
| 8,166,659 B2 | 5/2012 | Huang | |
| 8,220,164 B2 | 7/2012 | Linden et al. | |
| 8,225,513 B2 | 7/2012 | Huang | |
| 8,266,804 B2 * | 9/2012 | Huang | A01G 3/02 30/254 |
| 8,327,549 B2 | 12/2012 | Huang | |
| D677,539 S * | 3/2013 | Roberts | D8/57 |
| D678,022 S * | 3/2013 | Roberts | D8/57 |
| D679,559 S * | 4/2013 | Masalin | D8/5 |
| D684,027 S * | 6/2013 | Roberts | D8/57 |
| D684,828 S * | 6/2013 | Masalin | D8/5 |
| D693,192 S | 11/2013 | Masalin et al. | |
| 8,584,368 B2 | 11/2013 | Huang | |
| D700,029 S * | 2/2014 | Roberts | D8/57 |
| D700,030 S * | 2/2014 | Roberts | D8/57 |
| D700,493 S * | 3/2014 | Roberts | D8/57 |
| 8,661,691 B2 | 3/2014 | Huang | |
| D702,516 S | 4/2014 | Liu | |
| 8,826,545 B2 | 9/2014 | Goetz et al. | |
| 8,978,255 B2 * | 3/2015 | Wu | A01G 3/0251 30/185 |
| 9,003,667 B2 * | 4/2015 | Huang | A01G 3/02 30/254 |
| 9,345,200 B2 * | 5/2016 | Cunningham | A01G 3/0251 30/250 |
| 9,426,945 B2 * | 8/2016 | Hsu | A01G 3/021 30/250 |
| 2001/0000833 A1 * | 5/2001 | Chen | A01G 3/0251 30/341 |
| 2003/0014868 A1 | 1/2003 | Cech et al. | |
| 2003/0093906 A1 * | 5/2003 | Huang | B23D 29/026 30/250 |
| 2004/0194320 A1 * | 10/2004 | Hsieh | A01G 3/0255 30/250 |
| 2006/0026845 A1 | 2/2006 | Lin | |
| 2009/0047065 A1 * | 2/2009 | Cheng | A01G 3/0251 403/370 |
| 2010/0162575 A1 | 7/2010 | Lin | |
| 2010/0223794 A1 | 9/2010 | Block et al. | |
| 2010/0269357 A1 | 10/2010 | Shan | |
| 2011/0154668 A1 | 6/2011 | Liu et al. | |
| 2012/0311872 A1 | 12/2012 | Wang | |
| 2014/0053413 A1 | 2/2014 | Huang | |
| 2014/0317937 A1 * | 10/2014 | Descombes | A01G 3/0251 30/192 |
| 2016/0120132 A1 * | 5/2016 | Hsu | A01G 3/021 30/251 |
| 2016/0158946 A1 * | 6/2016 | Matsushita | B26B 17/02 30/193 |

FOREIGN PATENT DOCUMENTS

| | | |
|---|---|---|
| DE | 804766 C | 4/1951 |
| DE | 29822421 | 3/1999 |
| DE | 20 2014 103 611 U1 | 12/2014 |
| DE | 20 2014 103 612 U1 | 1/2015 |
| EP | 1 625 784 A1 | 2/2006 |
| FR | 486693 A | 4/1918 |
| FR | 488129 A | 9/1918 |
| FR | 926212 A | 9/1947 |
| FR | 943745 A | 3/1949 |
| FR | 1162295 A | 9/1958 |
| FR | 2837126 A1 | 9/2003 |
| GB | 0 340 872 A | 1/1931 |
| GB | 0 452 010 A | 8/1936 |
| RU | 2168889 C2 | 6/2001 |
| RU | 2454315 C2 | 6/2012 |
| TW | 201112942 A * | 4/2011 |
| WO | WO 03/080298 A1 | 10/2003 |
| WO | WO-2006/066728 A1 | 6/2006 |
| WO | WO-2006/072309 | 7/2006 |
| WO | WO 2009/002908 A1 | 12/2008 |
| WO | WO-2012/033540 | 3/2012 |
| WO | WO 2015077090 A1 * | 5/2015 |

OTHER PUBLICATIONS

International Search Report and Written Opinion on Application PCT/US2014/065077, mail date Jan. 23, 2015, 14 pages.

English-language machine translation of TW 201112942, Ho Cheng Garden Tools Co. Ltd. (Apr. 16, 2011).

* cited by examiner

CUTTING TOOL WITH A VARIABLE PIVOT SYSTEM

CROSS-REFERENCE TO RELATED APPLICATIONS

The present application is a divisional of U.S. patent application Ser. No. 14/538,130 entitled "A CUTTING TOOL WITH A VARIABLE PIVOT SYSTEM," filed Nov. 11, 2014, which claims the benefit of U.S. Provisional Patent Application No. 61/906,754 entitled "CUTTING TOOL WITH A VARIABLE PIVOT SYSTEM," filed Nov. 20, 2013. Both of these applications are incorporated herein by reference in their entireties.

FIELD

The present disclosure relates to hand operated cutting tools. More particularly, the present disclosure relates to hand operated cutting tools with a variable pivot system.

BACKGROUND

This section is intended to provide a background or context to the disclosure recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

It is generally known to provide a hand operated cutting tool for use in pruning or trimming branches and the like, such as a lopper having a pair of pivoting members such as handles that actuate cutting jaws that cooperate to capture and sever a branch between the jaws. Such known loppers typically include a pair of handles pivotally movable between an open and closed position for actuating the cutting jaws between a full open and closed position. The known loppers may also include devices intended to increase the available leverage provided by the handles, including levers and/or gears that transmit and increase a force from the handles to the jaws.

As a lopper cuts through an object (e.g. a roughly cylindrical sample of a wood material), the force required to cut increases up to a maximum, at a location approximately sixty percent through the sample, then decreases at a generally similar rate until approximately ninety to ninety-five percent through the sample where the force required to complete the cutting operation rapidly decreases. Typical cutting tools such as a lopper are sized such that with the tool fully opened, the average human holds the handles with arms abducted and elbows facing outward, and move with a transverse flexion of the arms until the tool is fully closed. There is a reduction in the transverse flexion strength as the arms are abducted and elbows straightened, which tends to result in a changing force available from the user where the force required to cut the object is increasing.

In comparison to a two-hand operated cutting tool such as a lopper, one-hand operated cutting tools are typically controlled via a single hand of an operator. For example, pruners and scissors are typically held in a palm of an operator. However, like the two-hand operated cutting tools, the one-hand operated cutting tools typically include a pair of handles that can be actuated to move a pair of cutting members to cut through an object of the tool.

SUMMARY

One embodiment relates to a hand operated cutting tool. The hand operated cutting tool includes a first handle coupled to a first cutting member, the first handle having a first set of projections. The hand operated cutting tool also includes a second handle coupled to a second cutting member, the second handle having a second set of projections. The handles are movable between a full open position and a full closed position, wherein during a first region of travel the first and second sets of projections are at least partly engaged, and wherein during a second region of travel the first and second sets of projections are disengaged. According to one embodiment, the first region of travel defines approximately two-thirds of a cutting stroke while the second region of travel defines approximately one-third of the cutting stroke. According to another embodiment, the first and second sets of projections are structured as gear projections such that their engagement/disengagement provides a variable mechanical advantage to an operator of the tool with the engagement corresponding to a relatively greater mechanical advantage than the disengagement.

Another embodiment relates to a hand operated cutting tool. The hand operated cutting tool includes a first cutting member; a first handle including a second cutting member, wherein the second cutting member includes a first set of projections and is coupled to the first cutting member; and a second handle including a lever, wherein the lever includes a second set of projections and is coupled to the first cutting member. The first and second handles are movable between a full open position and a full closed position, wherein during a first region of travel proximate the full open position the first and second set of projections are disengaged, and during a second region of travel proximate the full closed position the first and second set of projections are at least partly engaged. Accordingly, in one embodiment, a relatively greater mechanical advantage from the at least partial engagement of the first and second sets of projections is provided in the first region of travel relative to the second region of travel.

Still another embodiment relates to a hand operated cutting tool. The hand operated cutting tool includes a first cutting member including a first pivot point and a second pivot point; a second cutting member coupled to the first cutting member at the second pivot point, wherein the second cutting member includes a first set of gear projections; and a lever coupled to the first cutting member at the first pivot point, wherein the lever includes a second set of gear projections. The first and second cutting members are movable between a full open position and a full close position that defines a cutting stroke, wherein the first and second set of gear projections are disengaged during a first region of the cutting stroke and at least partly engaged during a second region of the cutting stroke. According to one embodiment, the hand operated cutting tool is structured as a two-hand operated cutting tool, such as a lopper.

Yet another embodiment relates to a method of operating a hand operated cutting tool. The method includes providing a first cutting member including a first pivot point and a second pivot point; providing a second cutting member coupled to the first cutting member at the second pivot point, wherein the second cutting member includes a first set of projections; and providing a lever coupled to the first cutting member at the first pivot point, wherein the lever includes a second set of projections. According to one embodiment, during a cutting stroke, the first and second cutting members are movable between a full open position and a full close position. During a first region of travel proximate the full open position of the cutting stroke, the first and second set of projections are disengaged, and during a second region of travel of the cutting stroke proximate the full closed position, the first and second set of projections are at least partly engaged. The engagement and disengagement of the first and second set of projections provides a variable mechanical advantage to the cutting tool. As a result, an additional mechanical advantage is provided during a region of highest resistance of the object-to-be cut by the tool, which may aid use and appeal to users of the cutting tool.

Another embodiment relates to a method of minimizing an effort to cut through an object using a hand operated cutting tool. The method includes receiving human force data as a function of handle spacing for a hand operated cutting tool; receiving cut-through force data as a function of handle angle for the hand operated cutting tool; dividing the received human force data by the received cut-through force data to obtain a human ability factor curve; generating a mechanical advantage curve for the hand operated cutting tool; setting the mechanical advantage curve to peak at approximately a peak of the human ability factor curve; and determining a pitch circle based on the set mechanical advantage curve. According to one embodiment, the determined pitch circle is then provided in a geared portion of a variable pivot mechanism for the hand operated cutting tool.

One embodiment relates to a hand operated cutting tool. The hand operated cutting tool includes a first handle coupled to a first cutting member, wherein the first handle has a first set of projections. The hand operated cutting tool also includes a second handle coupled to a second cutting member, wherein the second handle has a second set of projections. The handles are movable between a full open position and a full closed position, wherein during a first region of travel proximate the full open position the first and second gear projections are at least partly engaged, and wherein during a second region of travel proximate the full closed position the first and second gear projections are disengaged.

Another embodiment relates to a hand operated cutting tool. The hand operated cutting tool includes a first handle having a pivot pin, a cam follower, and a first gear projection; a first cutting member having a bore, wherein the bore is structured to receive the pivot pin to couple the first handle to the first cutting member; and a second handle having a second cutting member and an elongated member, wherein the elongated member has a cam surface and a second gear projection. The handles are movable between a full open position and a full closed position during a cutting stroke, wherein during a first region of travel proximate the full open position of the cutting stroke the first and second gear projections are at least partly engaged, and wherein during a second region of travel proximate the full closed position of the cutting stroke the cam follower and the cam surface are engaged while the first and second gear projections are disengaged.

Still another embodiment relates to a method of operating a hand operating cutting tool. The method includes providing a first cutting member; providing a second cutting member coupled to the first cutting member; providing a first handle coupled to the first cutting member, the first handle having a first set of projections; and providing a second handle coupled to the second cutting member, the second handle having a second set of projections. According to one embodiment, during a cutting stroke, the first and second handles are movable between a full open position and a full close position. During a first region of travel proximate the full open position of the cutting stroke, the first and second set of projections are at least partly engaged, and during a second region of travel proximate the full close position of the cutting stroke, the first and second set of projections are disengaged.

Yet another embodiment a method of minimizing an effort to cut through an object using a one-hand operated cutting tool. The method includes receiving human force data as a function of handle spacing for a hand operated cutting tool; receiving cut-through force data as a function of handle angle for the hand operated cutting tool; dividing the received human force data by the received cut-through force data to obtain a human ability factor curve; generating a mechanical advantage curve for the hand operated cutting tool; setting the mechanical advantage curve to peak at approximately a peak of the human ability factor curve; and determining a pitch circle based on the set mechanical advantage curve. According to one embodiment, the determined pitch circle is then provided in a geared portion of a variable pivot mechanism for the one-hand operated cutting tool, wherein the geared portion corresponds to approximately two-thirds of a cutting stroke for the one-hand operated cutting tool.

DETAILED DESCRIPTION

Figure 1A:
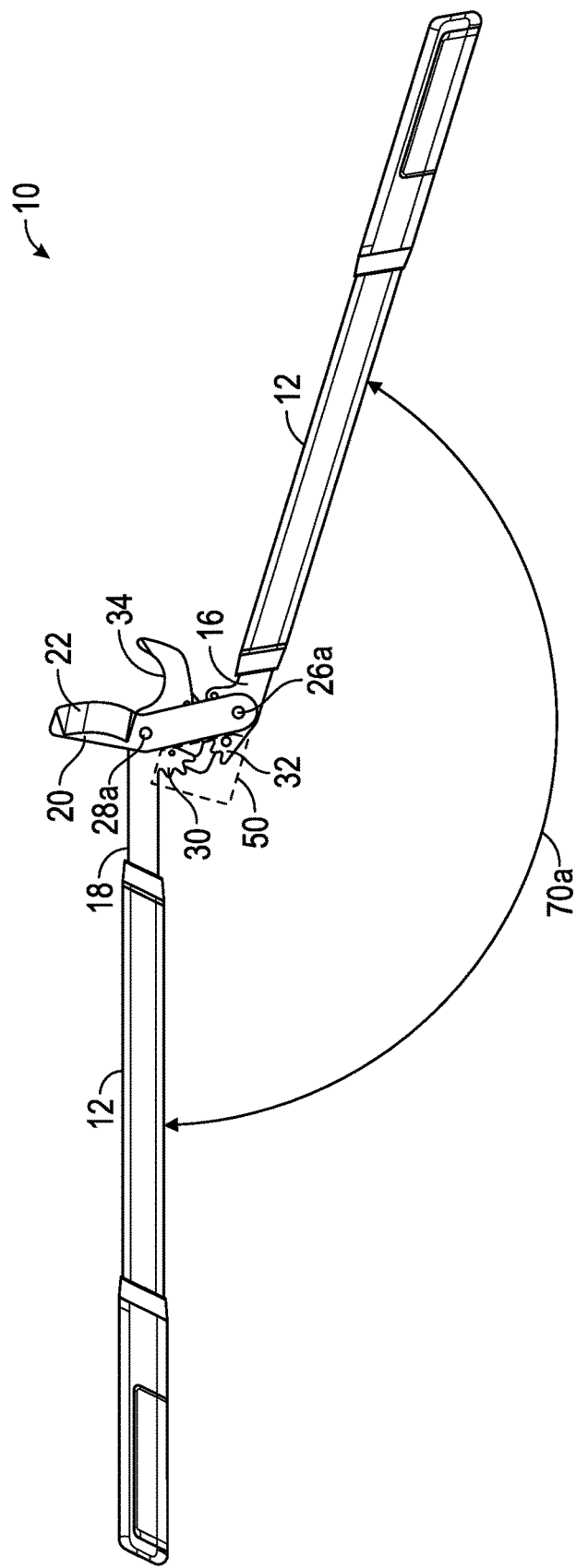
FIG. 1A is a schematic image of a two-hand operated cutting tool, such as a lopper, in a fully open position according to an exemplary embodiment.
Figure 1B:
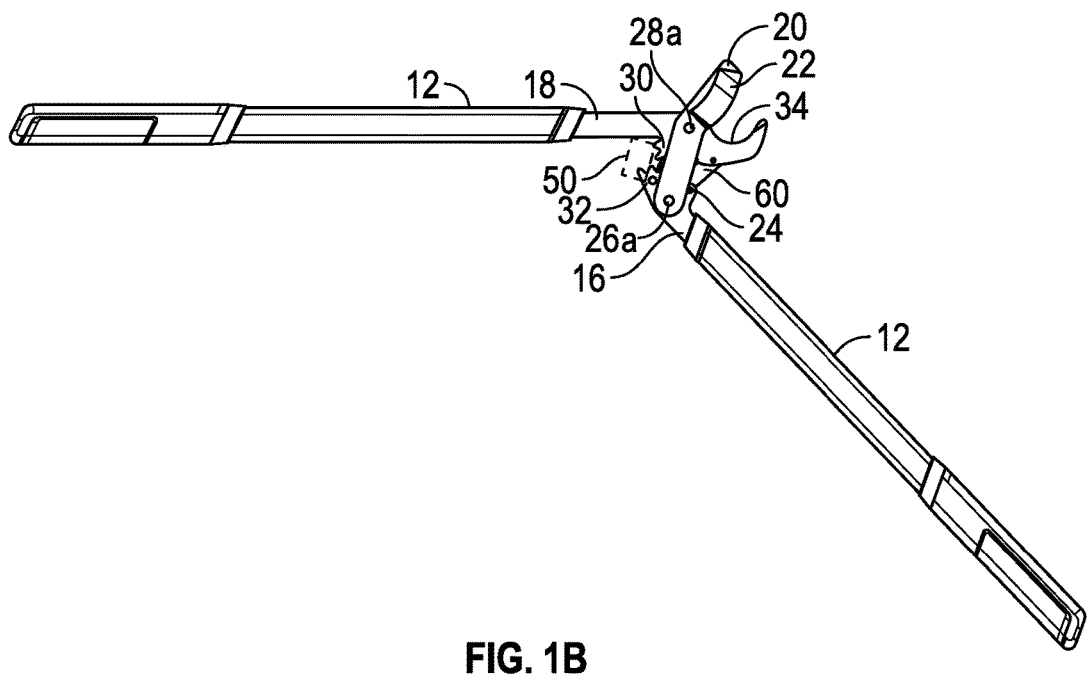
FIG. 1B is a schematic image of a two-hand operated cutting tool, such as a lopper, in a further open position according to an exemplary embodiment.
Figure 1C:
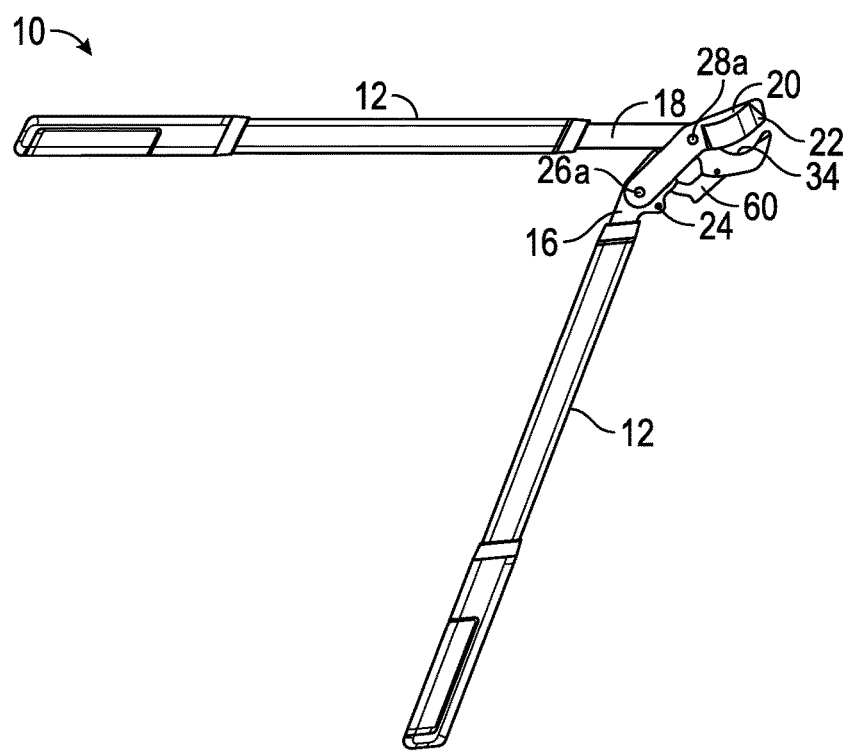
FIG. 1C is a schematic image of a two-hand operated cutting tool, such as a lopper, in a partially open position according to an exemplary embodiment.

Referring to FIGS. 1A-4B generally, a two-hand operated cutting tool, shown for example as a "lopper" having a pair of handles operable to actuate a pair of cutting members, is illustrated having a variable pivot system. A two-hand operated cutting tool is typically characterized with an operator using both hands to grab each of the handles in order to actuate the tool (e.g., a lopper). The variable pivot system is configured to control the opening and closing of one of the cutting members and includes a geared portion and a slide portion that are actuated at different times through the progression of a cutting stroke of the tool. As referred to herein, the cutting stroke refers to a start position of the handles (and, correspondingly, the cutting members) being separable by a maximum distance (e.g., full open, etc.) and an end position with the handles being separated by a minimum distance (e.g., full closed, etc.). Conversely, the opening stroke refers to a full closed start position and a full open end position. Within a first region represented by an approximate one-third of the cutting stroke, the interaction between the handles and cutting members is provided by a slide portion of the variable pivot system. After the first region of the cutting stroke, the variable pivot system transitions to a second region for the remaining approximate two-thirds of the cutting stroke. In the second region, the interaction is provided by a geared portion of the variable pivot system. As such, during approximately the final two-thirds of the cutting stroke (i.e., where the cutting tool severs an object, such as a branch or tree limb), the variable pivot system provides a leverage profile defined by the geared portion. As described more fully herein, the combination of a geared portion and a slide portion in the variable pivot system provides for a variable mechanical advantage with the cutting tool. Particularly, a relatively greater mechanical advantage may be provided by the geared portion relative to the slide portion during the cutting stroke. As also described herein, by providing the geared portion at only a select travel region during the cutting stroke, a human effort to cut objects using the hand operated cutting tool may be minimized at a key location (i.e., where the object is most resistant to being cut) during the cutting stroke.

According to an exemplary embodiment for a two-hand operated cutting tool, a lever (e.g. link, arm, etc.) is pivotally coupled to a first cutting member of the cutting tool and to one of the handles. As the lever travels from a fully open to a fully closed position, the lever experiences an approximately curvilinear line travel from the slide portion to the geared portion and vice versa. From the standpoint of the force required to cut through an object, typically, the object's resistance and, therefore, the force required to cut through the object varies based on the position of the handles (e.g., the angle between the handles). At large angles (i.e., a more fully open handle position), the resistance is minimal. But, at approximately sixty-degrees, a maximum resistance is generally encountered in the cutting stroke through the maximum-sized object for which the tool is designed. In comparison, from the standpoint of human force characteristics, the maximum produced human force typically decreases with increasing distance between the handles of the cutting tool.

Because the first region of the cutting stroke corresponds to a "least resistance" encountered in cutting the object (e.g., relatively low force required), the slide portion of the variable pivot system is engaged. Accordingly, the slide portion of the variable pivot system has a relatively lower mechanical advantage in comparison to the geared portion because the slide portion has no mechanism for mechanical advantage (i.e., the geared portion utilizes meshable gears to increase mechanical advantage but the slide portion has no such mechanism). Rather, the mechanical advantage in the slide portion is provided by the length of the handles and a single pivot mechanism. However, during the second region (i.e., approximately the final two-thirds) of the cutting stroke, where greater resistance is encountered in cutting the object, the geared portion of the variable pivot system is engaged to provide an increased mechanical advantage. Because the geared portion is not engaged throughout the entire cutting stroke (i.e., only in the second region corresponding to about the final two-thirds of the cutting stroke), the pitch of the gears may be increased (i.e., beyond a pitch commonly associated with a cutting tool having a geared leverage mechanism operating throughout the entire cutting stroke). According to an exemplary embodiment, the gear teeth of the geared portion are at least partially elliptical such that a variable mechanical advantage is provided during the final two-thirds of the cutting stroke. Because of the increased gear pitch available through the use of a combined slide and gear arrangement, a greater amount of mechanical advantage may be provided during the final two-thirds of the cutting stroke where a maximum force is required to cut through an object. As such, the human force required to cut through an object may be overall minimized.

Although the various features of the disclosure are shown and described above by way of example with reference to a two-hand operated cutting tool (e.g., a lopper), the variable pivot system may be used with a wide variety of cutting devices including, but not limited to a primarily one-hand operated cutting tool. All such variations are intended to be within the scope of this disclosure. Accordingly, referring to FIGS. 5-10B generally, a one-hand operated cutting tool having a pair of handles operable to actuate a pair of cutting members, is illustrated having a variable pivot system. In comparison to the two-hand operated cutting tool, the one-hand operated cutting tool may be used with a single hand of an operator, such that the one-hand operated cutting tool may include, but is not limited to, pruners, shears, scissors, etc.

Similar to the variable pivot system of the two-hand operated cutting tool, the variable pivot system of a one-hand operated cutting tool substantially controls the opening and closing of one of the cutting members and includes a geared portion and a slide portion that are actuated at different times through the progression of a cutting stroke of the tool. Within a first region of the cutting stroke (approximately two-thirds), the interaction between the handles and cutting members is provided by a geared portion of the variable pivot system. After the first region of the cutting stroke, the variable pivot system transitions to a second region for the remaining approximate one-third of the cutting stroke (i.e., the slide portion). As such, during the final one-third of the cutting stroke, the variable pivot system provides a leverage profile defined by the slide portion.

As compared to a two-hand operated cutting tool, the configuration of the variable pivot system for a one-hand operated cutting is substantially reversed. Based on empirical data, as hand-grip spacing decreases (e.g., the distance between the handles of a one-hand operated cutting tool while the tool is in the palm/hand of a user) from a maximum distance for the tool to a minimum distance, the available force a user can exert increases. In comparison, as the distance decreases from a maximum distance between the handles of a two-hand operated cutting tool to a minimum distance, the available force a user can exert generally decreases. Because the available force a user can exert is relatively lower at larger hand-grip distances, a mechanism (e.g., geared portion) provides an increased mechanical advantage during the first region of the cutting stroke for a one-hand operated cutting tool. By not providing the geared mechanism throughout the cutting stroke, the pitch circles of the meshable gears may be increased (i.e., beyond a pitch commonly associated with a cutting tool having a geared leverage mechanism operating throughout the entire cutting stroke). Accordingly, the variable pivot system of the one-hand operated cutting tool works to reduce the effort required to cut through an object by providing an additional mechanical advantage to the user when the user is typically at their weakest.

Thus, an advantage of the present disclosure is that a lower effort requirement is generated by the variable pivot system, while staying within traditional constraints of two-hand (as well as one-hand) operated cutting tools. For example, traditional constraints include human and physical limitations that restrict the maximum handle angle opening, geometric and cut-capacity limitations that restrict the distance the cutting members (e.g., blades) can open, etc. The present disclosure does not merely lengthen the handles, but rather utilizes human force characteristics to substantially stay within traditional constraints to reduce the effort required to cut through an object using a two-hand (and one-hand) operated cutting tool.

Although specific examples are shown and described throughout this disclosure, the embodiments illustrated in the figures are shown by way of example, and any of a wide variety of other cutting member configurations, lever devices, pivot systems, and cutting device types (e.g. snips, pruners, shears, etc.) will be readily apparent to a person of ordinary skill in the art after reviewing this disclosure. All such variations of cutting tools that use the variable leverage system are intended to be within the scope of the disclosure. Moreover, as referred to herein, the object of a cutting tool can include a wide variety of objects, such as branches, twigs, weeds, small trees, etc.

Referring more particularly now to FIGS. 1A-1D, a two-hand operated cutting tool is shown, for example as a lopper 10, according to an exemplary embodiment. The lopper 10 is shown to include a pair of handles 12, wherein one of the handles 12 is coupled to a lever 16 and the other handle 12 is coupled to a second cutting member 18. The lopper is further shown to include a first cutting member 20, which includes a first aperture 26a and a second aperture 28a (also referred to herein as pivot points). The first cutting member 20 includes a first cutting device 22, shown for example as a blade. The second cutting member 18 includes a second cutting device 34 (shown for example as a hook, but may be an anvil, blade or other cutting device according to alternative embodiments) that engages with the first cutting device 22 in a shearing relationship to cut through an object.

According to an exemplary embodiment, the first cutting member 20 is pivotally coupled to the second cutting member 18 at the second aperture 28a and the second aperture 28b of the second cutting member 18. The first cutting member 20 is also pivotally coupled to the lever 16 at the first aperture 26a and the first aperture 26b of the lever 16. First and second apertures 26a, 26b, 28a, and 28b are shown to include pivot connections utilizing, for example, bolts, pins, lugs, studs, etc. According to an exemplary embodiment, a first bolt rotatably couples the first cutting member 20 to the second cutting member 18 at the second apertures 28a and 28b, and a second bolt rotatably couples the first cutting member 20 to the lever 16 at the first apertures 26a and 26b. In operation, the second cutting member 18 rotates about the second apertures 28a and 28b, and the lever 16 rotates about the first apertures 26a and 26b.

As described in greater detail below, rotation of the lever 16 about the first apertures 26a and 26b is constrained during the slide portion of the variable pivot mechanism 50 via a travel stop 24 and a locking projection 42 (shown as a cam follower 42) to cam surface 52 interaction (see FIG. 3). As shown, the travel stop 24 extends from the lever 16 in an opposite direction relative to an extension direction of the cam follower 42 from the lever 16. By constraining the movement of the lever 16, the geared projections 30, 32 repeatedly engage from the slide portion to the geared portion transition to allow the two-hand operated cutting tool to function correctly.

The lopper 10 is shown to further include a variable pivot system 50. The variable pivot system 50 includes a first set of projections 30 coupled to the second cutting member 18 and a second set of projections 32 coupled to the lever 16. The projections 30, 32 are structured to be engaged with one another during the second region (i.e., approximately the final two-thirds) of the cutting stroke. According to an exemplary embodiment, the first and second sets of projections 30, 32 include mesh-able gears formed by interacting gear teeth. According to an exemplary embodiment, the gear teeth provided as gear projections 30, 32 are configured to have at least a partially elliptical pitch. As used herein, the phrase "elliptical pitch" refers to a line joining two rotating axes (i.e., the line/arc defining the intersection of gears 30, 32) that is elliptically shaped. In comparison, a "circular pitch" refers to a line joining two rotating axes (i.e., the line/arc defining the intersection of gears 30, 32) that is circularly shaped. As such, according to an alternate embodiment, the gear teeth provided as gear projections 30, 32 are configured to not have a partially elliptical pitch (e.g., circular).

Because the gear projections 30, 32 are engaged during only the final two-thirds of the cutting stroke, the at least partially elliptical pitch of each gear projection 30, 32 may be increased to allow for a greater mechanical advantage. By definition, a gear ratio is the mechanical advantage one gear provides over the other gear. Typically, geared loppers are configured to permit the handles to open to approximately 160 degrees, which usually corresponds to a blade (i.e., cutting device) opening of about 70 degrees (i.e., a gear ratio of 16:7). According to the present disclosure, because of the variable pivot system 50, the first 20 degrees of the handles closing corresponds to the slide portion (i.e., the first region) that closes the blade 20 degrees (i.e., a ratio of 1:1). However, the handles closing the remaining 140 degrees corresponds to the blade closing the remaining 50 degrees in the second region (i.e., a gear ratio of 14:5; a 23% increase in mechanical advantage over 16:7). The increase in mechanical advantage is because when two gears have ratios greater than 1:1 (as is the case here), they act as two levers of different lengths—an input of more angular motion distance into one gear (more rotations) provides more torque out of the other gear due to it traveling a relatively smaller amount of rotations or angular displacement than it previously had to in order to output that same amount of torque (e.g., the difference between the larger gear ratio of 14:5 to the smaller gear ratio of 16:7). So here, as the gear ratio is increased from increasing the gear pitch due to the structure of the variable pivot system 50, the result is an increase in mechanical advantage for the two-hand operated cutting tool (and the one-hand operated cutting tool, as described below). As such, the two-hand operated cutting tool with variable pivot system 50 typically provides an increase in mechanical advantage over traditional variable leverage geared loppers.

Figure 1D:
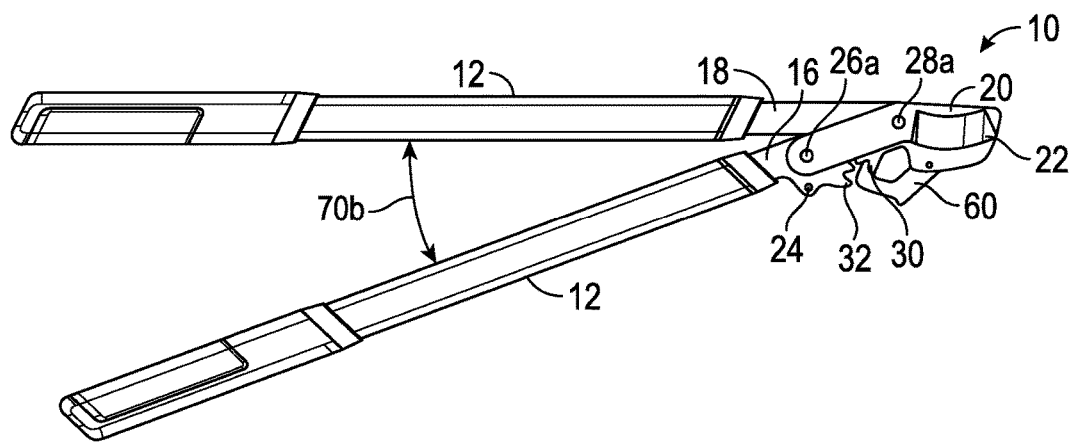
FIG. 1D is a schematic image of a two-hand operated cutting tool, such as a lopper, in a fully closed position according to an exemplary embodiment.

Referring collectively now to the two-hand operated cutting tool in FIGS. 1A-1D, operation of the loppers 10 through the cutting stroke is now described. In the full open position (FIG. 1A), the handles 12 are at a maximum distance and angle 70a from each other. In the full open position, the first gear projection 30 and the second gear projection 32 are also at a maximum distance away from each other. As a user applies flexion force to the handles 12 to move them closer together within the first region, the lever 16 slides (i.e., the slide portion of the variable pivot system 50) toward the second cutting member 18 along a curvilinear path 56 (see FIG. 3). The curvilinear path 56 is defined by the interaction between a cam follower 42 (i.e., locking projection) and a cam surface 52 of a guide member 60. During the lever 16 sliding via the interaction of the cam follower 42 and the cam surface 52, the lever 16 rotates about the second apertures 28a and 28b. Due to the cam follower 42 and the travel stop 24 (described below and shown in FIGS. 2A-2B), the lever 16 is substantially restricted from rotating about the first apertures 26a and 26b during the slide portion of the variable pivot system 50. After approximately one-third of the cutting stroke, the lever 16 has translated (e.g. "slid") along the curvilinear path 56 into a position where the second gear projection 32 approaches the first gear projection 30 to initiate engagement of the geared projections during travel through the second region of the cutting stroke (see FIG. 1B). At this point on the curvilinear path 56 (i.e., approximately at a slide portion endpoint 58 in FIG. 3), the slide portion transitions to the geared portion of the cutting stroke and the cam follower 42 disengages from the cam surface 52 thereby permitting the geared projections 30, 32 to engage. In addition to the cam follower 42 disengaging from the cam surface 52, the travel stop 24 disengages from the first cutting member 20. As such, during travel through the geared portion of the cutting stroke, the lever 16 rotates about the first apertures 26a and 26b such that the gear projections 30, 32 can engage. In turn, rotational force from the interaction of the gear projections 30, 32 is transferred to the first cutting device 22 (e.g., an increased mechanical leverage). Thus, the first cutting device 22 rotates about the second apertures 28a and 28b (see FIG. 1C). At the end of the cutting stroke where the handle angle 70b is at a minimum, a fully closed position is obtained. FIG. 1D shows an example of the fully closed position where no line-of-sight gap exists between the first cutting device 22 and second cutting device 34 and the gear projections 30, 32 are at least partially engaged. Moreover, in the fully closed position, the handles are separable by a minimum distance and angle 70b.

Figure 2A:
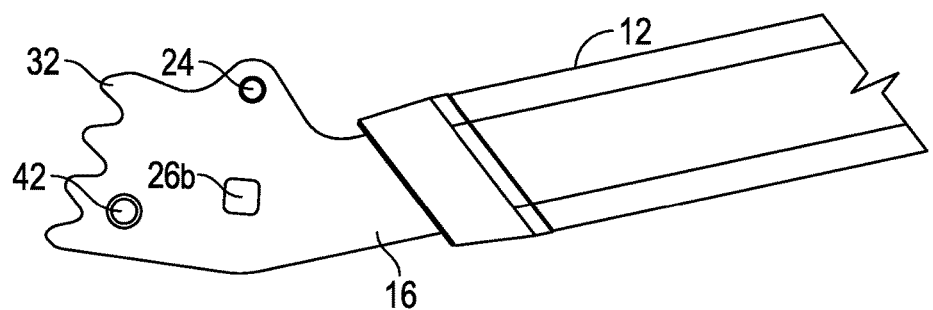
FIG. 2A is a schematic image of a front view of a lever for a two-hand operated cutting tool according to an exemplary embodiment.
Figure 2B:
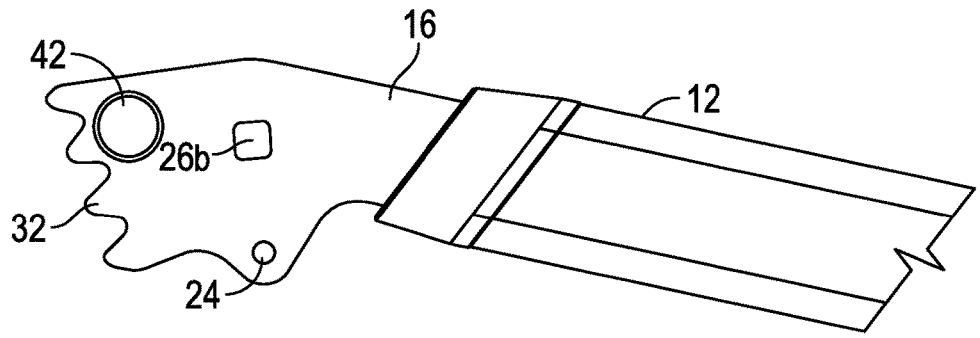
FIG. 2B is a schematic image of a back view of a lever for a two-hand operated cutting tool according to an exemplary embodiment.

Referring next to FIG. 2A, a front view of the lever 16 is shown according to an exemplary embodiment. The front view of FIG. 2A represents the views depicted in FIGS. 1A-1D, where the first cutting member 20 is shown overlaying the lever 16. In comparison, FIG. 2B shows the back view of the lever 16 according to an exemplary embodiment. In addition to the second set of projections 32, the lever 16 includes a travel stop 24 and a cam follower 42.

From the full closed position, as the handles 12 are pulled apart toward the full open position and the variable pivot system is about to transition from the geared portion to the slide portion (i.e., the opening stroke), the travel stop 24 engages with the first cutting member 20 to substantially prevent the lever 16 (and, in turn, the handle 12 coupled to the lever 16) from rotating (i.e., counterclockwise) about the first apertures 26a and 26b. The travel stop 24 allows the user to pull open and slide or translate the lever away (i.e., the slide portion of the variable pivot system 50) from the second cutting member 18 by preventing the lever 16 from rotating about the first apertures 26a and 26b. While the travel stop 24 prevents the lever from rotating about the first aperture 26 during the slide portion of the opening stroke, the cam follower 42 maintains the path of travel of the cam follower 42 (and, consequently, the lever 16) along a curvilinear path 56 (see FIG. 3). During the cutting stroke, the cam follower 42 travels toward a slide portion end point 58 via translation along the curvilinear path 56. In comparison, during the transition from the geared portion to the slide portion in the opening stroke, the cam follower 42 travels away from the end point 58 along the curvilinear path 56 as the lever 16 is translated further away from the second cutting member 18.

As the cam follower 42 travels along the curvilinear path 56 (i.e., during the slide portion of the opening and cutting strokes), the cam follower 42 interacts with a cam surface 52 of the guide member 60. This interaction restricts the cam follower 42 (and, lever 16) from straying from the curvilinear path 56. At or near the end point 58 during the cutting stroke, the cam follower 42 disengages with the cam surface 52 to permit the geared portions 30, 32 to engage. Because of the restriction of travel of the cam follower 42 to the curvilinear path 56, a consistent engagement and disengagement between the geared projections 30, 32 occurs.

According to an exemplary embodiment, the travel stop 24 includes a vertically extended (i.e., perpendicular to the lever 16) member coupled to the lever 16 that contacts the first cutting member 20 during the slide portion of the opening stroke to substantially restrict the lever 16 from rotating about the first apertures 26a and 26b. According to alternate embodiments, the travel stop 24 can include an integral extension from lever 16, a bent piece of metal welded to the lever 16, a roller coupled to the lever 16, a bent piece of metal otherwise coupled to the lever 16, and/or a protruding bolt, lug, pin, etc. In comparison, the cam follower 42 (i.e., locking projection) can include a vertically extended (i.e., perpendicular to the lever 16) member protruding in the opposite direction to that of the travel stop 24. The cam follower 42 prevents the geared projections 30, 32 from not engaging during the geared portion of the variable pivot mechanism 50 because the cam follower 42 travels along a consistent curvilinear path 56 during the slide portion of the variable pivot mechanism 50. In some embodiments, the cam follower 42 can include a protruding bolt, roller, lug, pin, bent piece of metal, welded piece of metal, an integral piece of material with the lever, etc.

Figure 3:
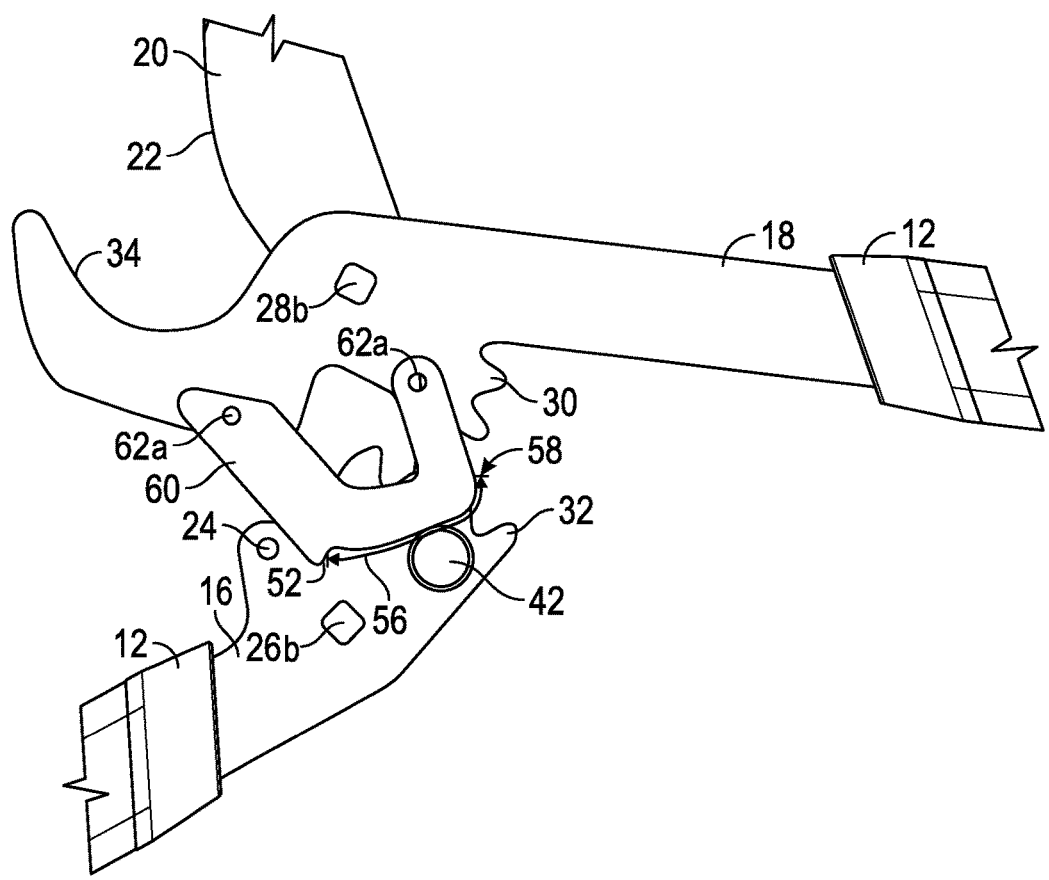
FIG. 3 is a schematic image of a back view of a two-hand operated cutting tool, such as a lopper, according to an exemplary embodiment.

Referring more particularly to FIG. 3, a back view of the lopper 10 is shown according to an exemplary embodiment. FIG. 3 depicts the interaction between the cam follower 42 and the cam surface 52 of the guide member 60. According to an exemplary embodiment, the guide member 60 is stationary (i.e., the guide member 60 remains fixed relative to the second cutting member 18, despite the movement of the cutting members 18, 20 and the lever 16). The guide member 60 includes a cam surface 52, which the cam follower 42 interacts with during the slide portion of the variable pivot mechanism 50. The interaction between the cam surface 52 and the cam follower 42 constrains and guides the cam follower 42 along the curvilinear path 56. According to an exemplary embodiment, the guide member 60 is coupled to the second cutting member 18 at apertures 62a of the guide member 60 and apertures 62b of the second cutting member 18. The coupling mechanism between the guide member 60 and second cutting member 18 can include bolts, pins, screw, set-screws, etc. According to an alternate embodiment, the guide member 60 is coupled to the second cutting member 18 at the second apertures 28a and 28b (e.g., by a bolt or other suitable device). According to an alternate embodiment, the guide member 60 is integral with the second cutting member 18 (e.g., one cast piece). Although FIG. 3 depicts a generally U-shaped guide member 60, FIG. 3 is not meant to be limiting as to the shape of the guide member 60. For example, the guide member 60 could be hook-shaped or C-shaped, or other any other shape suitable for constraining and/or guiding motion of the cam follower 42 to allow repeated and consistent interaction between the geared projections 30, 32. According to an exemplary embodiment, the guide member 60 can be made of metal, but according to alternative embodiments, the guide member 60 can be made out of any suitably rigid and durable material.

Figure 4A:
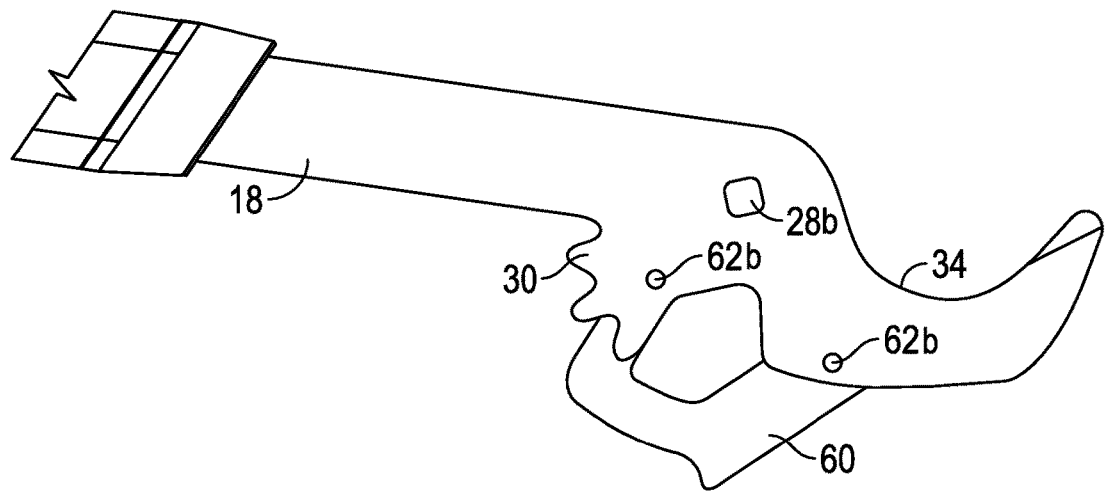
FIG. 4A is a schematic image of a front view of a second cutting member coupled to a guide member for a two-hand operated cutting tool according to an exemplary embodiment.
Figure 4B:
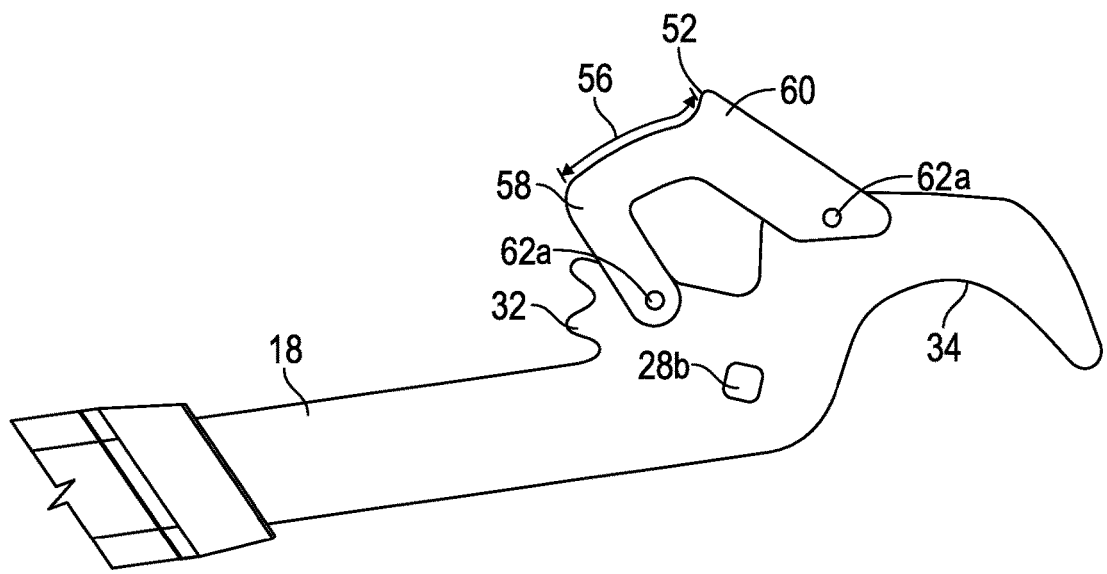
FIG. 4B is a schematic image of a back view of a second cutting member coupled to a guide member for a two-hand operated cutting tool according to an exemplary embodiment.

Referring to FIG. 4A, a front view of the second cutting member 18 having second cutting device 34 is shown according to an exemplary embodiment. Although FIG. 4A depicts the second cutting device 34 as a hook, the second cutting device 34 can take a variety of forms (e.g., a blade, a saw-like configuration, etc.) and is configured to apply pressure opposite to the first cutting device 22 to cut through an object. Referring to FIG. 4B, a back view of the second cutting member 18 coupled to the guide member 60 is shown according to an exemplary embodiment.

Figure 18:
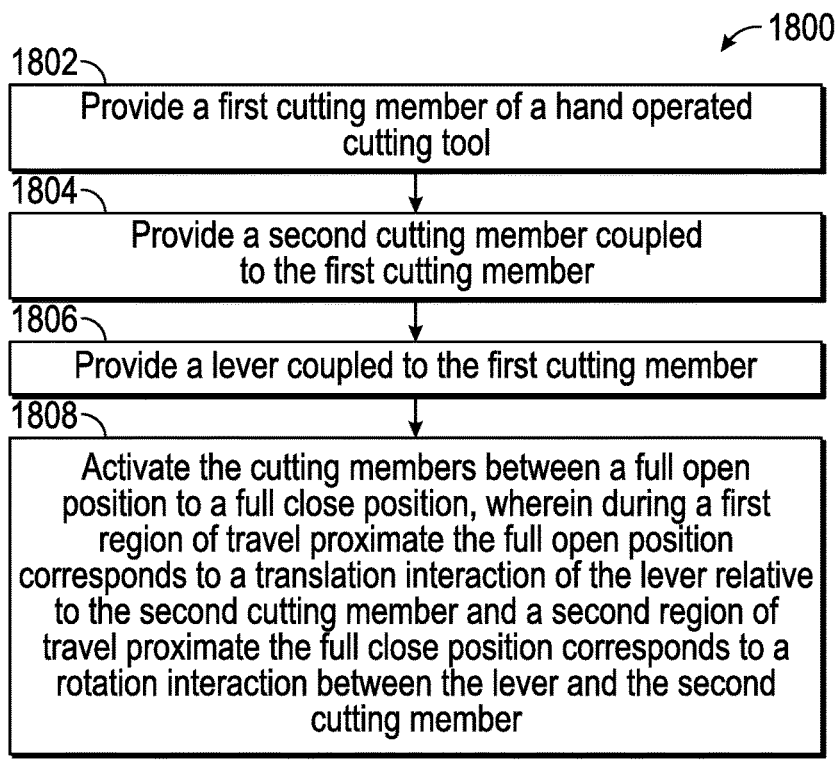
FIG. 18 is a diagram of a method of operating a two-hand operated cutting tool with a variable pivot mechanism, according to an exemplary embodiment.

Referring to FIG. 18, a method 1800 of operating a two-hand operated cutting tool, is shown according to one embodiment. According to one embodiment, method 1800 may be implemented with the cutting tool of FIGS. 1A-4B and, as such, may be described in regard to one or more features of that cutting tool. At step 1802, a first cutting member of a hand operated cutting tool is provided. According to one embodiment, the first cutting member includes first and second pivot points. At step 1804, a second cutting member coupled to the first cutting member is provided. According to one embodiment, the second cutting member is coupled to the first cutting member at the second pivot point. The second cutting member may also include a first set of projections (e.g., projections 30). At step 1806, a lever coupled to the first cutting member is provided. In one embodiment, the lever is coupled to the first pivot point of the first cutting member. The lever may include a second set of projections (e.g., projections 32). At step 1808, the cutting members are actuated between a full open position to a full close position. In a first region of travel proximate the full open position, a translation (e.g., sliding, etc.) interaction between the lever relative to the second cutting member is provided. In a second region of travel proximate the full close position, a rotation interaction between the lever and the second cutting member is provided. According to one embodiment, the rotation interaction is provided by the at least partial engagement of the first and second set of projections. According to one embodiment, the first and second set of projections are structured as gear projections. The gear projections may have a partial elliptical pitch, a circular pitch, etc. During the first region of travel, the projections are disengaged and become engaged during the second region of travel. In one embodiment, the second region corresponds with approximately two-thirds of a cutting stroke and the first region corresponds with approximately one-third of the cutting stroke. As described, method 1800 largely corresponds with operation of the two-hand operated cutting tool. Accordingly, in one embodiment, features described in regard to FIGS. 1A-4B that are not described in regard to method 1800 may be included in other variations of method 1800 and is intended to fall within the spirit and scope of the present disclosure.

Figure 5:
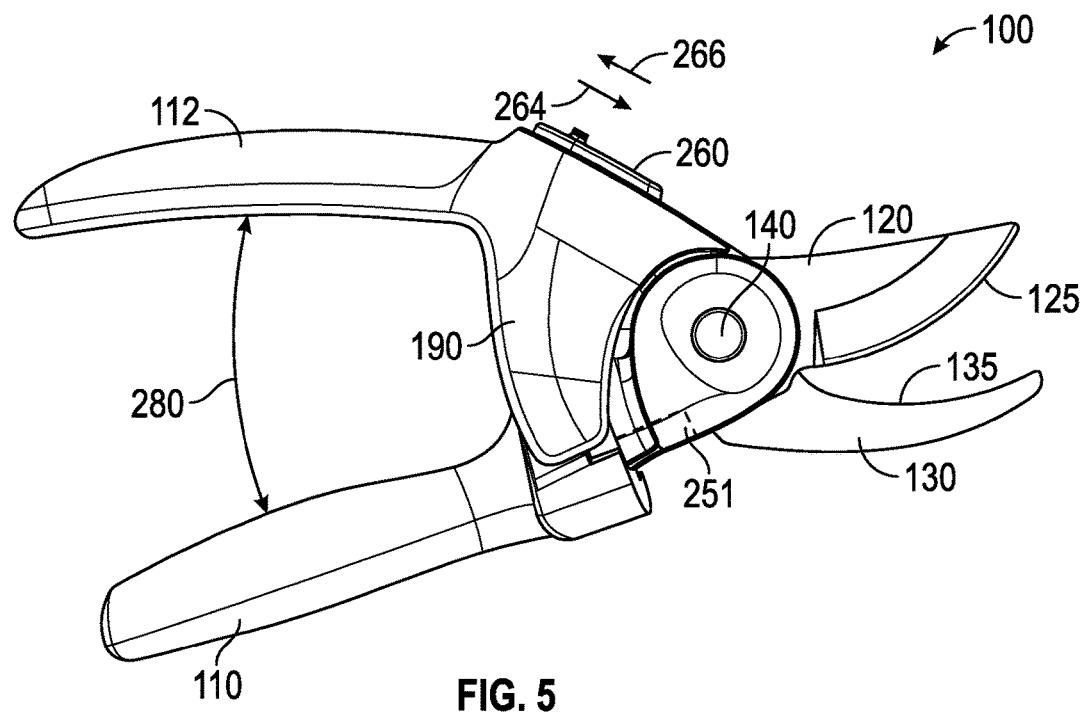
FIG. 5 is a schematic image of a side view of a one-hand operated cutting tool, such as a hand pruner, in a fully open position according to an exemplary embodiment.
Figure 6:
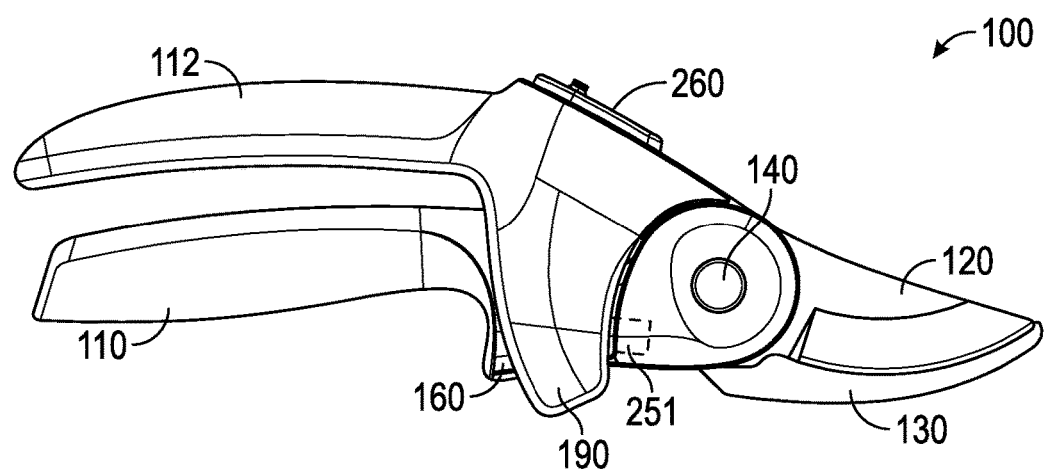
FIG. 6 is a schematic image of a side view of a one-hand operated cutting tool, such as a hand pruner, in a fully closed position according to an exemplary embodiment.

Referring now to FIGS. 5-6, a one-hand operated cutting tool, shown for example as a hand pruner 100 with a variable pivot system, is illustrated according to an exemplary embodiment. The hand pruner 100 is shown to include a pair of handles 110 and 112, where the first handle 110 is coupled to a first cutting member 120 and the second handle 112 is coupled to a second cutting member 130. According to the embodiment depicted, the second handle 112 is integral with the second cutting member 130. The hand pruner 100 is shown to also include an elongated member 190 coupled to the second handle 112. The elongated member 190 may be integral with the second handle 112 or a separate component attached by any typical manner (e.g., bolt, weld, etc.). According to an exemplary embodiment, the first cutting member 120 includes a first cutting device 125 and the second cutting member 130 includes a second cutting device 135. First and second cutting devices 125 and 135 may include blades, a blade and anvil configuration, saws, hooks, and other types of cutting structure configurations. According to an exemplary embodiment, the first cutting member 120 is pivotally coupled to the second cutting member 130 at aperture 140 (also referred to herein as a pivot point). The first and second cutting members 120 and 130 rotate about aperture 140 as a user squeezes the handles 110 and 112 together. Aperture 140 is shown to include connections such as bolts, pins, lugs, studs, etc.

Referring more particularly to FIGS. 7A-7D, a one-hand operated cutting tool is shown, for example as a hand pruner 100 with a variable pivot system 150, according to an exemplary embodiment. Please note that material from the handle 110 has been removed in FIGS. 7A-7D to illustrate the interaction between the first and second sets of projections 160, 170. For example, in FIG. 8A, the material has not been removed from the handle 110, which makes it slightly more difficult to observe the first set of projections 160. Accordingly, referring back to FIGS. 7A-7D, as in FIGS. 5-6, the hand pruner 100 is shown to include a pair of handles 110 and 112; a pair of cutting members 120 and 130, where the first cutting member 120 is coupled to the first handle 110 and the second cutting member 130 is coupled to the second handle; a first cutting device 125 coupled to the first cutting member 120 and a second cutting device 135 coupled to the second cutting member 130; an elongated member 190 coupled to the second handle 112; and, among other features, a variable pivot system 150.

Referring more particularly to the variable pivot system 150 of the hand pruner 100, the variable pivot system 150 includes a cam surface 175 coupled to the second handle 112 and a cam follower 165 coupled to the first handle 110. The cam surface 175 is shown to be included as an integral piece on the elongated member 190 of the second handle 112. In one embodiment, the cam follower 165 is the top most projection of the first set of projections 160 (i.e., closest to the handle 112). According to another embodiment, the cam follower 165 may be structured as any type of component (e.g., a roller, etc.) that engages with the cam surface 175 during a second region of the cutting stroke (described below). According to an exemplary embodiment, the first handle 110 includes a first set of projections 160 and the second handle 112 includes a second set of projections 170. As shown in FIGS. 7A-7D, the cam surface 175 and the second set of projections 170 are positioned on an interior surface of the elongated member 190, such that the first set of projections 160 are facing both the cam surface 175 and the second set of projections 170. In other words, the cam surface 175 and the second set of projections 170 are proximate the first handle 110. According to one embodiment, the projections 160 and 170 are engaged only during the first region of the cutting stroke (i.e., approximately the first two-thirds). According to an exemplary embodiment, the first and second sets of projections 160 and 170 include meshable gears formed by interacting gear teeth. According to an exemplary embodiment, the gear teeth provided as gear projections 160 and 170 have at least a partially elliptical pitch. According to an alternate embodiment, the gear teeth provided as gear projections 160 and 170 do not have a partially elliptical pitch (e.g., they may have a circular pitch).

Figure 8A:
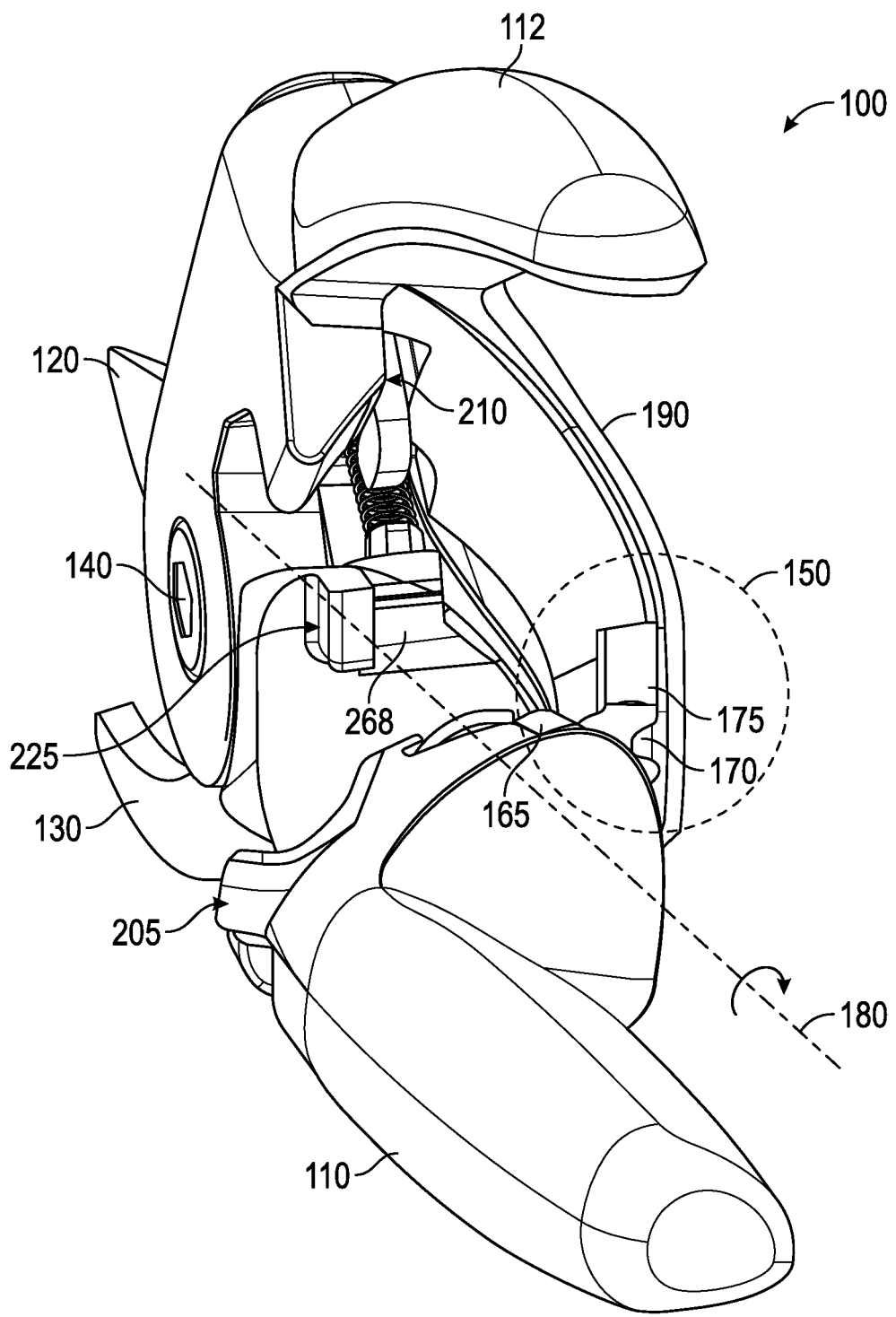
FIGS. 8A-8E are schematic images of a one-hand operated cutting tool, such as a pruner, through the cutting stroke from a different viewpoint than that depicted in FIGS. 7A-7D according to an exemplary embodiment.
Figure 8B:
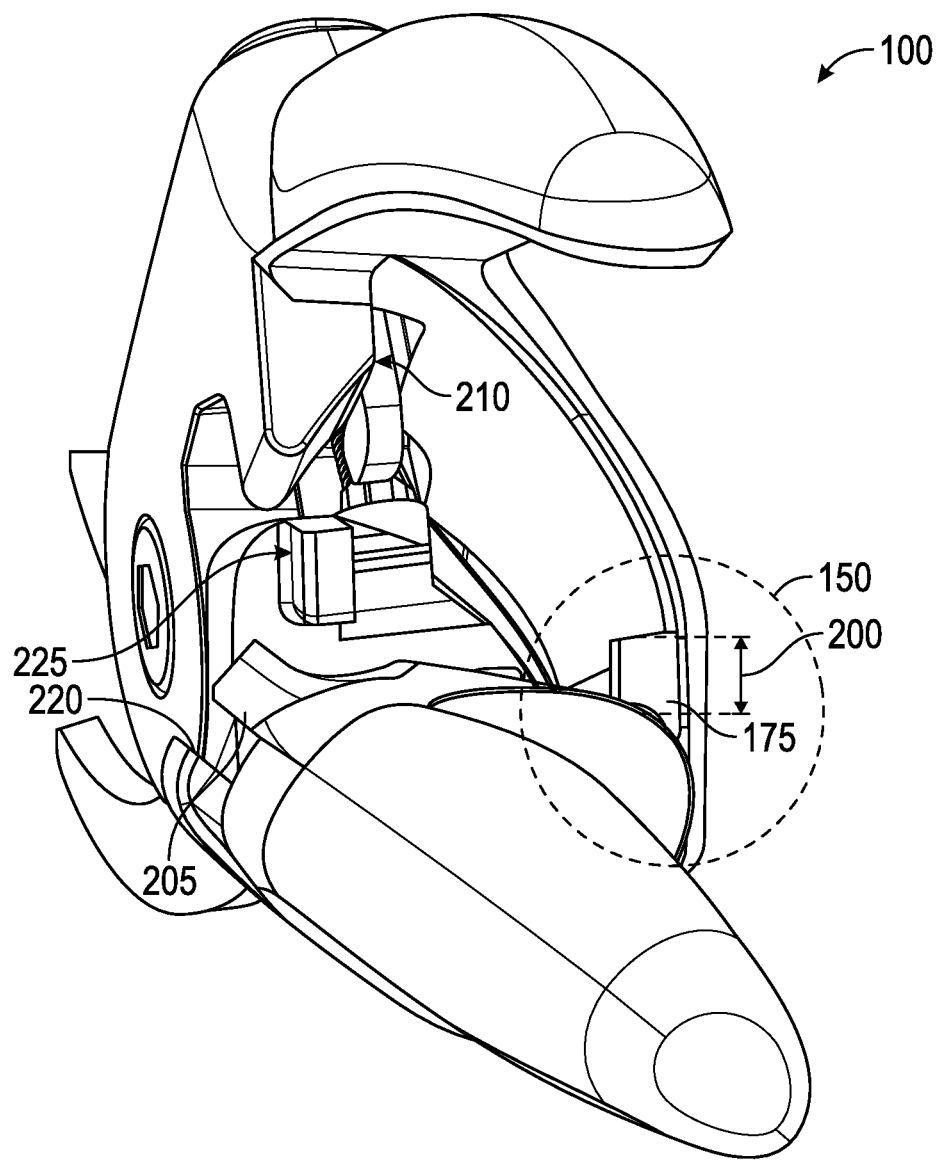
Figure 8C:
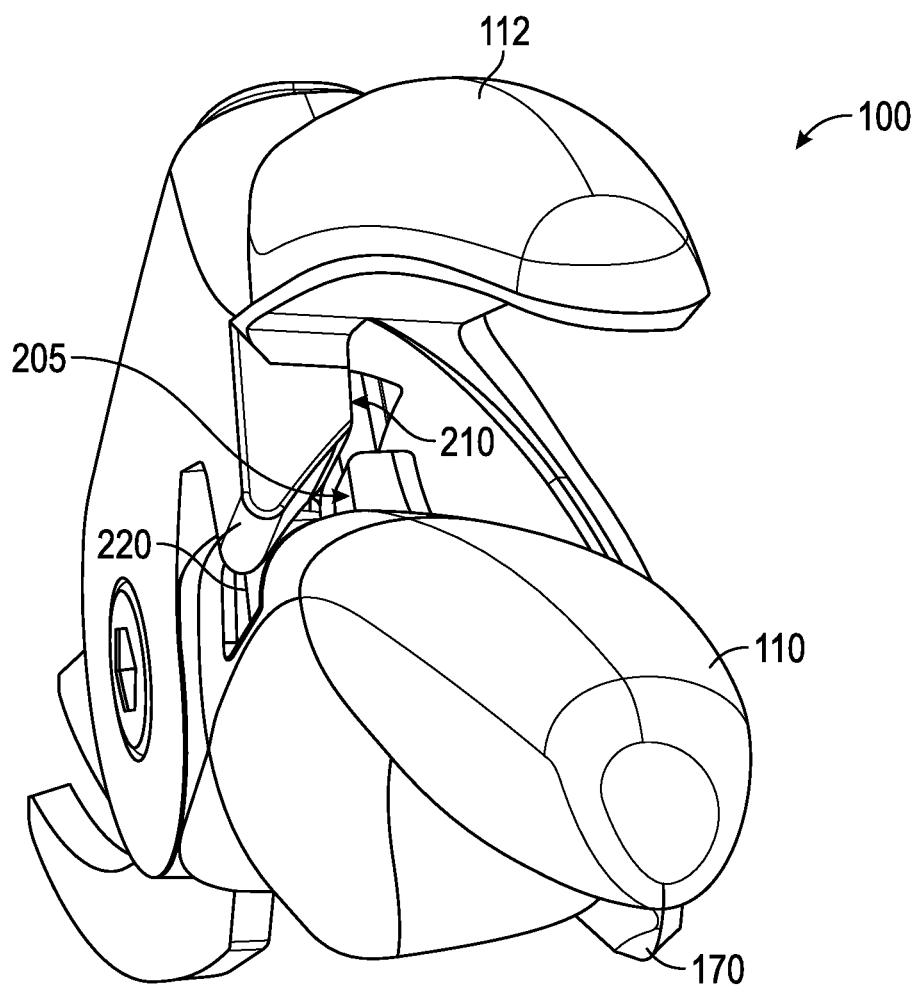
Figure 8D:
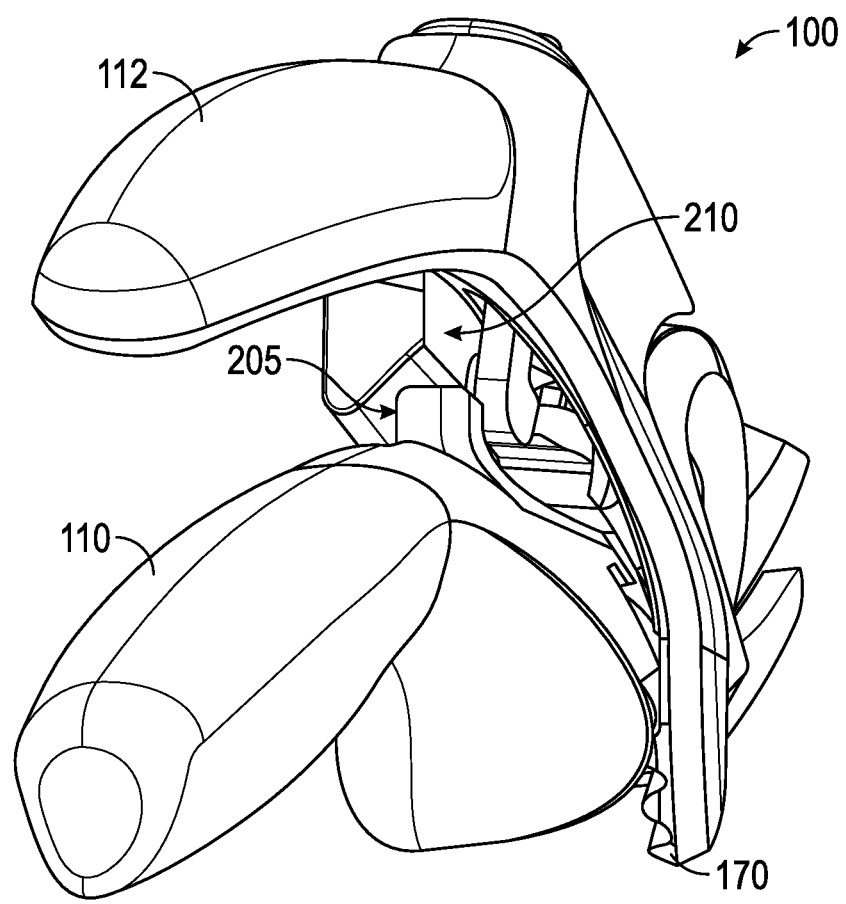
Figure 9A:
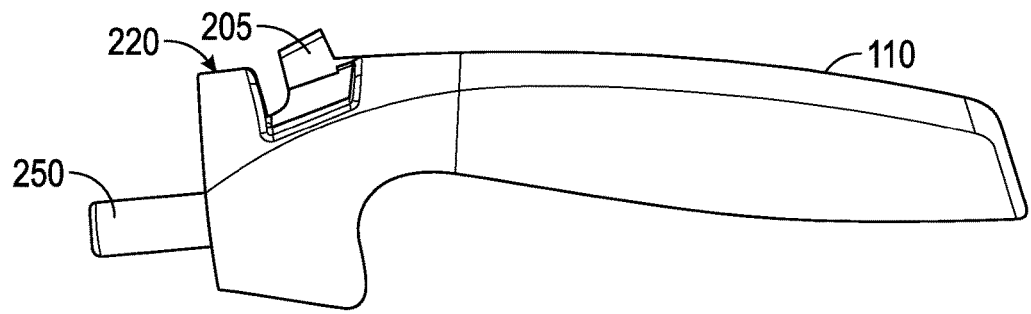
FIG. 9A is a schematic image of a side view of a first handle of a one-hand operated cutting tool, such as a pruner, according to an exemplary embodiment.
Figure 9B:
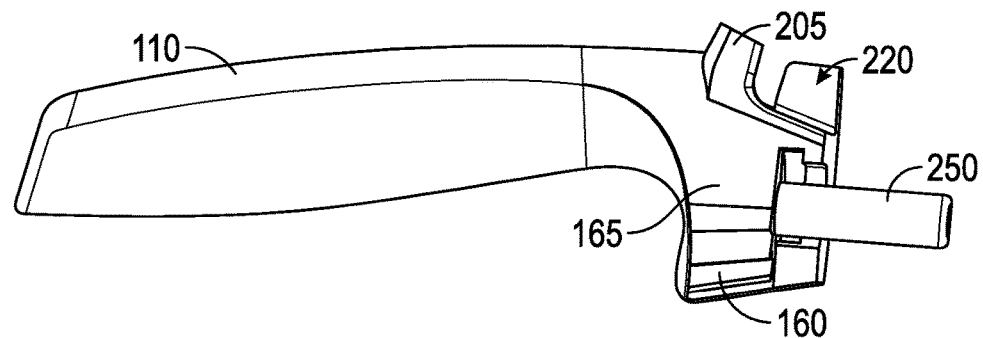
FIG. 9B is a schematic image of a side view opposite to that of FIG. 9A of a first handle of a one-hand operated cutting tool, such as a pruner, according to an exemplary embodiment.

The first handle 110 is shown to also include a pivot pin 250 (FIGS. 9A-9B). The pivot pin 250 is received in a bore 251 of the first cutting member 120 (FIGS. 5-6), which rotatably couples the first handle 110 to the first cutting member 120. A rotation axis 180 is defined by the pivot pin 250 in the bore 251 (FIG. 8A). Because the pivot pin 250 is rotatably coupled within bore 251 of the first cutting member 120, the first handle rotates about the rotation axis 180.

Figure 7A:
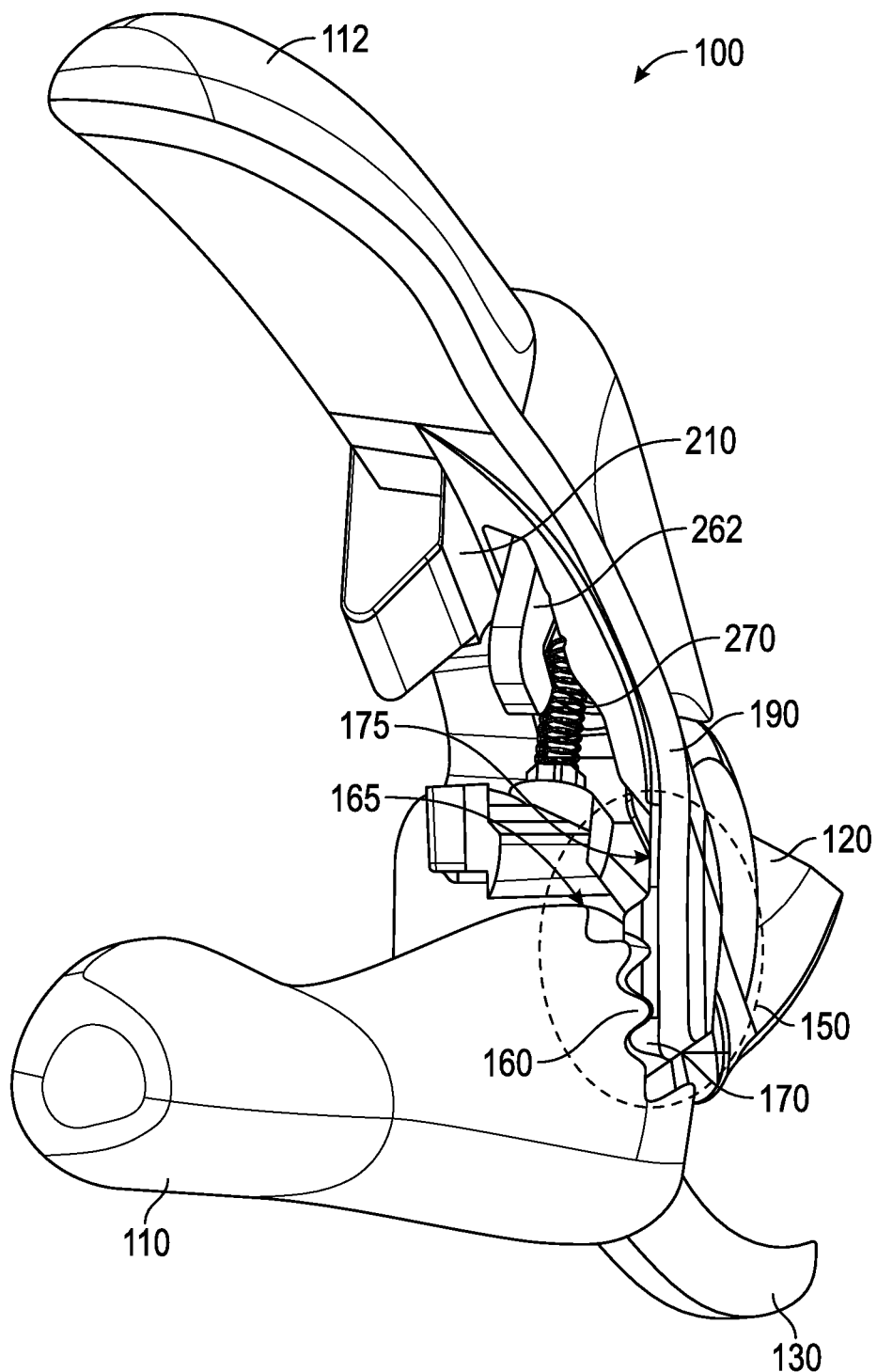
FIG. 7A is a schematic image of a one-hand operated cutting tool, such as a pruner, in a fully open position according to an exemplary embodiment.
Figure 7B:
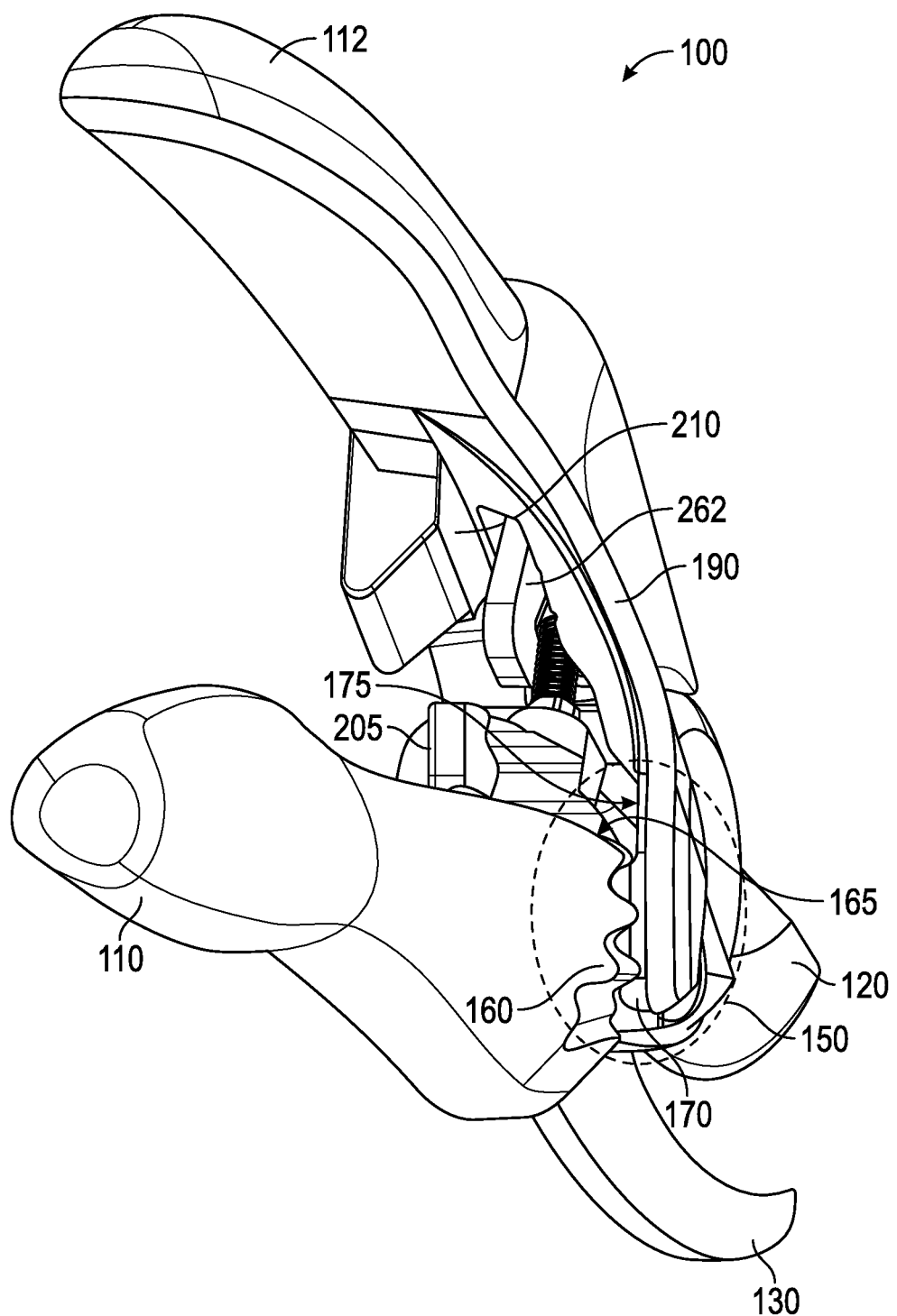
FIG. 7B is a schematic image of a one-hand operated cutting tool, such as a pruner, in a further open position according to an exemplary embodiment.

According to one embodiment, the second handle 112 includes a locking device 260. The locking device 260 may be structured as a separate component relative to the second handle 112. In other embodiments, the locking device 260 is an integral component of the second handle 112. The locking device 260 is shown to include a locking projection 262 (FIG. 7A). The locking device 260 is translatable in directions 264, 266. Moving the locking device 260 in a direction 264 engages the locking projection 262 with a notch 268 (e.g., groove, recess, capture, etc.) in the first cutting member 120 when the handles 110, 112 are in the full close position. The engagement of the locking projection 262 and the notch 268 locks the handles in the full close position. Moving the locking device 260 in a direction 266 releases the locking projection 262 from the notch 268 to unlock the handles 110, 112 and permit their movement to the full open position (characterized by the handles 110, 112 being a maximum distance and angle away from each other; the full close position is characterized by the handles being a minimum distance and angle from each other). By locking the handles in the full close position, the tool 100 occupies a relatively lesser amount of space for relatively easier storage. In some embodiments of the hand operated cutting tool 100, the locking device 260 may not be included. All such variations are intended to fall within the spirit and scope of the present disclosure.

As shown in FIG. 7A, the tool 100 may include a biasing member, shown as a spring 270. According to one embodiment, the spring 270 biases the handles 110, 112 into the full open position. As a result, the handles 110, 112 and cutting members 120, 130 are substantially prevented from getting in a "stuck" position where the tool becomes hard to operate. It should be understood that while the biasing member is structured as a spring herein, other biasing members may be used in place of or in addition to the spring (e.g., a collapsible and expandable rod) with all such variations intended to fall within the spirit and scope of the present disclosure.

Figure 7C:
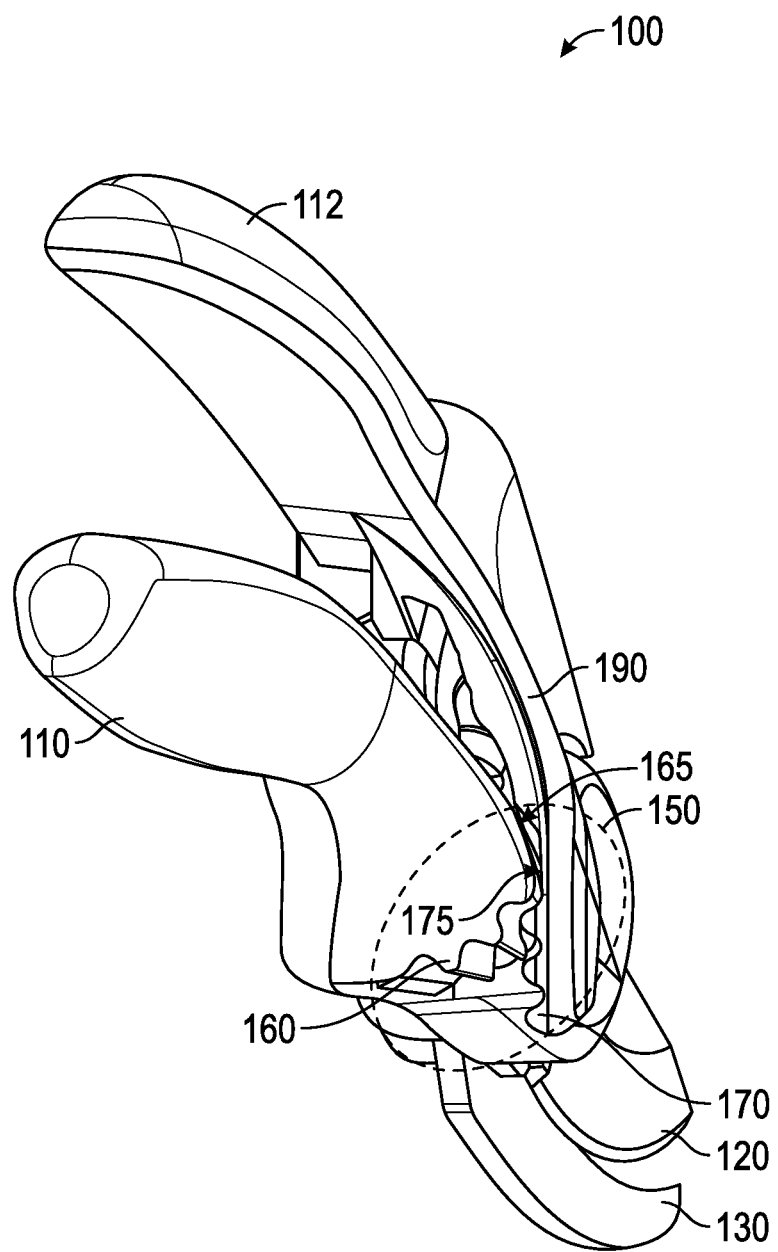
FIG. 7C is a schematic image of a one-hand operated cutting tool, such as a pruner, in a partially open position according to an exemplary embodiment.
Figure 7D:
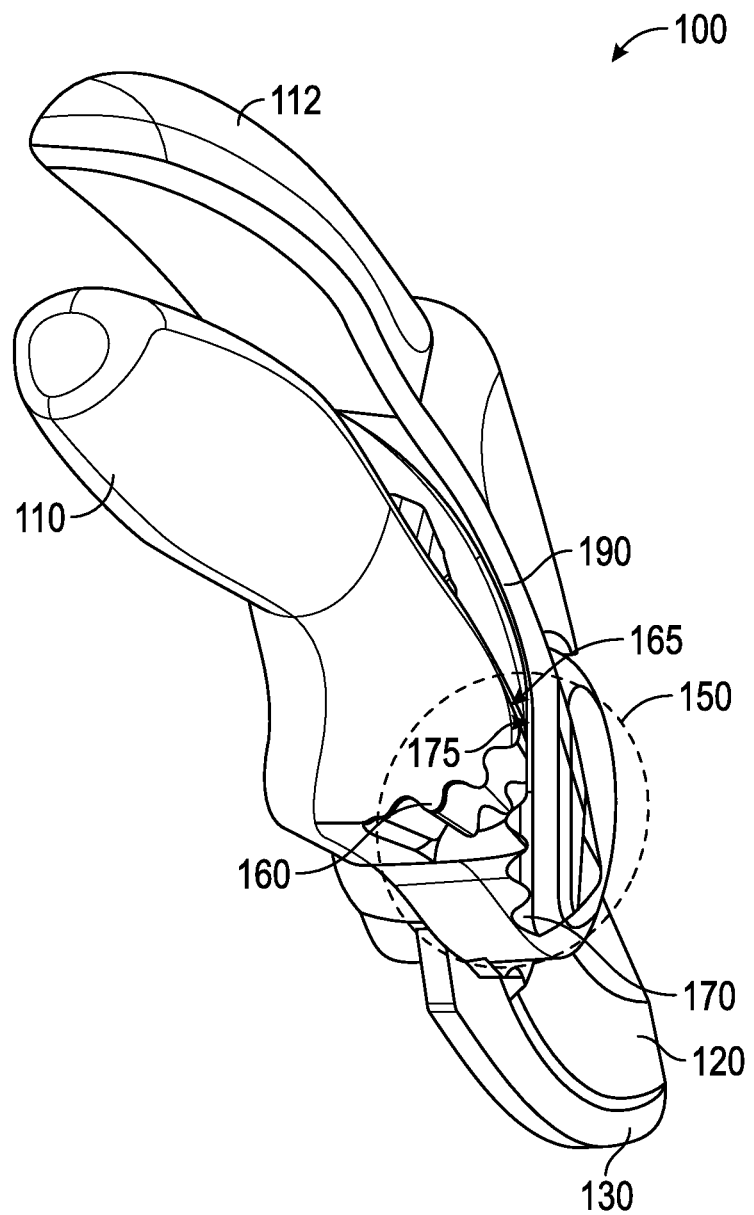
FIG. 7D is a schematic image of a one-hand operated cutting tool, such as a pruner, in a fully closed position according to an exemplary embodiment.
Figure 10A:
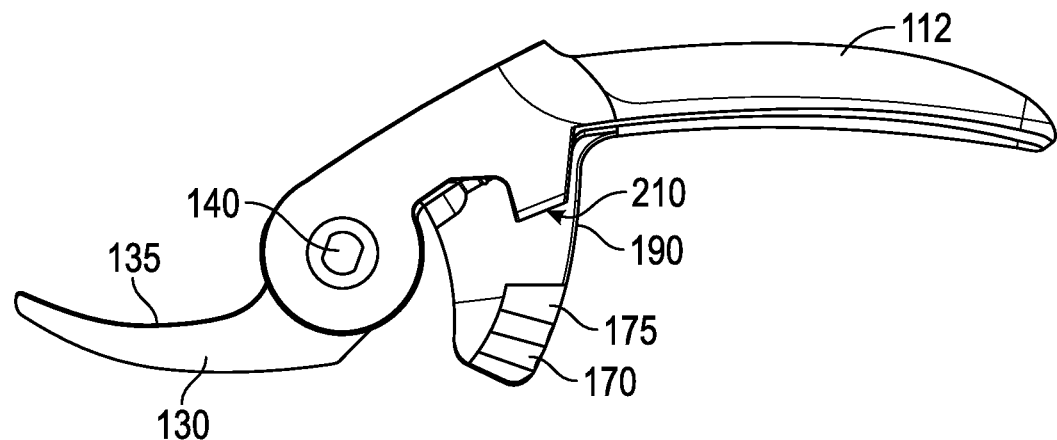
FIG. 10A is a schematic image of a side view of a second handle of a one-hand operated cutting tool, such as a pruner, according to an exemplary embodiment.
Figure 10B:
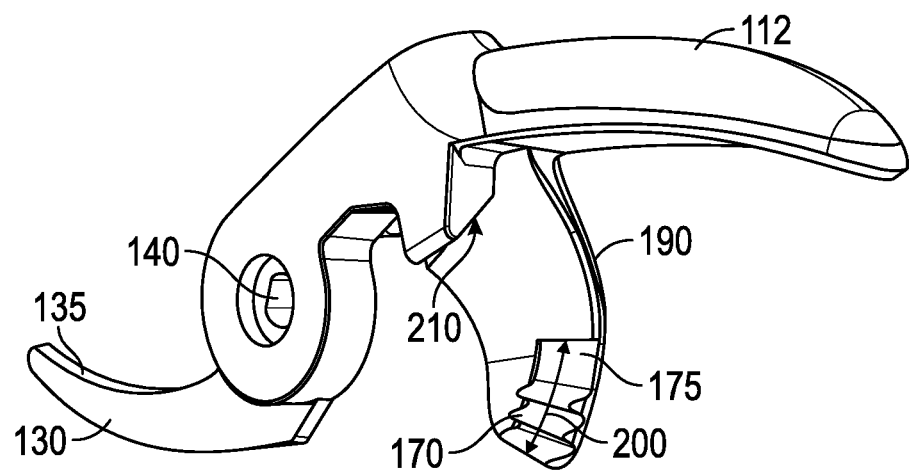
FIG. 10B is a schematic image of an isometric view of a second handle of a one-hand operated cutting tool, such as a pruner, according to an exemplary embodiment.

Referring collectively now to the one-hand operated cutting tool in FIGS. 7A-7D, operation of the hand pruner 100 through the cutting stroke is now described. In the full open position (FIG. 7A), the handles 110 and 112 are at a maximum distance and angle 280 from each other. In the full open position, the first gear projection 160 and the second gear projection 170 are at least partially engaged. As a user applies flexion force to move the handles 110 and 112 closer together within the first region, the handle 110 rotates clockwise about the rotation axis 180. As the handle 110 rotates, the first gear projection 160 at least partly engages with the second gear projection 170 and the handle 110 rotates upward toward (i.e., closer) the second handle 112 (FIG. 7B) thereby decreasing the angle 280. After approximately the first two-thirds of the cutting stroke, the projections 160 and 170 become disengaged and the geared portion transitions to the slide portion of the variable pivot system 150 (FIG. 7C). After disengagement of the gear projections 160 and 170, as user continues to apply flexion force the handle 110 slides or translates along a path defined by the interaction of the cam follower 165 with the cam surface 175. In the example shown, the cam surface 175 is positioned above the projections 170 (FIG. 10B). As a result, an interaction of the first and second gear projections 160, 170 in the first region of the cutting stroke, and a transition to an interaction of the cam surface 175 and cam follower 165 in the second region of the cutting stroke occurs along a continuous path 200 defined by the elongated member 190. In the full close position (FIG. 7D), the gear projections 160 and 170 are disengaged; the handles 110 and 112 are separated by a minimum distance and angle; the locking projections 205 and 210 are engaged; and the rotation stops 220 and 225 are engaged.

The arrangement between the gear projections 160 and 170 converts the rotational force applied by the user into a rectilinear force as the handles 110 and 112 are squeezed closer together during the first region of the cutting stroke. However, during the slide portion of the cutting stroke, translation of the first handle 110 along a portion of the path 200 defined by only the cam surface to cam follower interaction (no partial engagement of the projections) provides for a pure rectilinear force (no rotational element other than that relative to the aperture 140). Based on empirical data, for a hand pruner of a given handle length, the average human strength capability increases with decreasing handle angle (i.e., as the handles move closer together, the user is able to exert more force to cut through an object). Accordingly, the average user is weakest when the handles are in the full open position. By implementing a variable pivot system, the human strength characteristics can be accounted for by providing a relatively greater amount of mechanical advantage where it is most beneficial to a typical user (i.e., the beginning of the cutting stroke; the first region). As such, the first region corresponds to the geared portion and the second region corresponds to the slide portion of the variable pivot mechanism. During the slide portion, the mechanical advantage is limited to the length of the handles of the hand pruner. However, during the geared portion, additional mechanical advantage is provided by the interacting gears in the geared portion (hence, a relatively greater mechanical advantage than just from the length of the handles). Moreover, because the geared portion is limited to the first two-thirds of the cutting stroke, the pitch of the gears may be increased without affecting the practicality of the hand pruner. For example, practical considerations relating to the tool can include the size of the tool. If the geared portion was provided throughout the entire cutting stroke and the pitch of the gears increased, then the whole tool would likely need to increase to accommodate the larger gears. However, because the geared portion does not correspond to the entire cutting stroke, the gear pitch can increase (corresponding to greater mechanical advantage) while staying within practical considerations relating to the hand pruner. As described above, increasing the gear pitch increases the gear ratio, which increases the mechanical advantage (i.e., a relatively greater angular displacement in gear 32 via the handle results in more torque output due to a relatively smaller angular displacement of the gear 30 for the two-hand operated cutting tool).

Referring next to FIGS. 8A-8E, a different viewpoint of the geared portion and slide portion of the variable pivot mechanism 150 during the cutting stroke is shown according to an exemplary embodiment. Also shown in FIGS. 8A-8E is the cam surface 175 to cam follower 165 interaction along a portion of the path 200 during the slide portion of the cutting stroke. The engagement between the cam surface 175 and the cam follower 165 guides the movement of the handle 110 during the slide portion. Furthermore, in the second region (i.e., slide portion), rotation of the first handle 110 is substantially constrained via the interaction of the first locking projection 205 with the second locking projection 210. Rotation of the first handle 110 is also substantially constrained in another direction by the interaction between a first rotation stop 220 and a second rotation stop 225. Accordingly, during the second region, the handles 110 and 112 can only move relative to the aperture 140 (i.e., a simple pivot mechanism). The interactions described above will be explained in greater detail in the paragraphs that follow due to the relatively clearer accompanying figures.

Referring to FIGS. 9A-9B, a front (FIG. 9A) and back (FIG. 9B) view of the first handle 110 are shown, according to an exemplary. Referring to FIGS. 10A-10B, a front (FIG. 10A) and isometric (FIG. 10B) view of the second handle 112 are shown, according to an exemplary embodiment. In addition to other features, the first handle 110 is shown to include a first locking projection 205. Similarly, the second handle 112 is shown to include a second locking projection 210. According to an exemplary embodiment, the first locking projection 205 is structured an integral extension from the first handle 110 while the second locking projection 210 is structured as an integral extension from the second handle 112. In other embodiments, the first and second locking projections 205, 210 may be of any structured (e.g., a welded piece, molded piece, etc.) and therefore coupled to the first handle 110 and second handle 112 in any fashion. According to an exemplary embodiment, the first handle 110 is shown to include a first rotation stop 220 and the first cutting member 120 is shown to include a second rotation stop 225. According to an exemplary embodiment, the rotation stops 220 and 225 are integral extensions from the first handle 110 and the first cutting member 120, respectively.

Figure 8E:
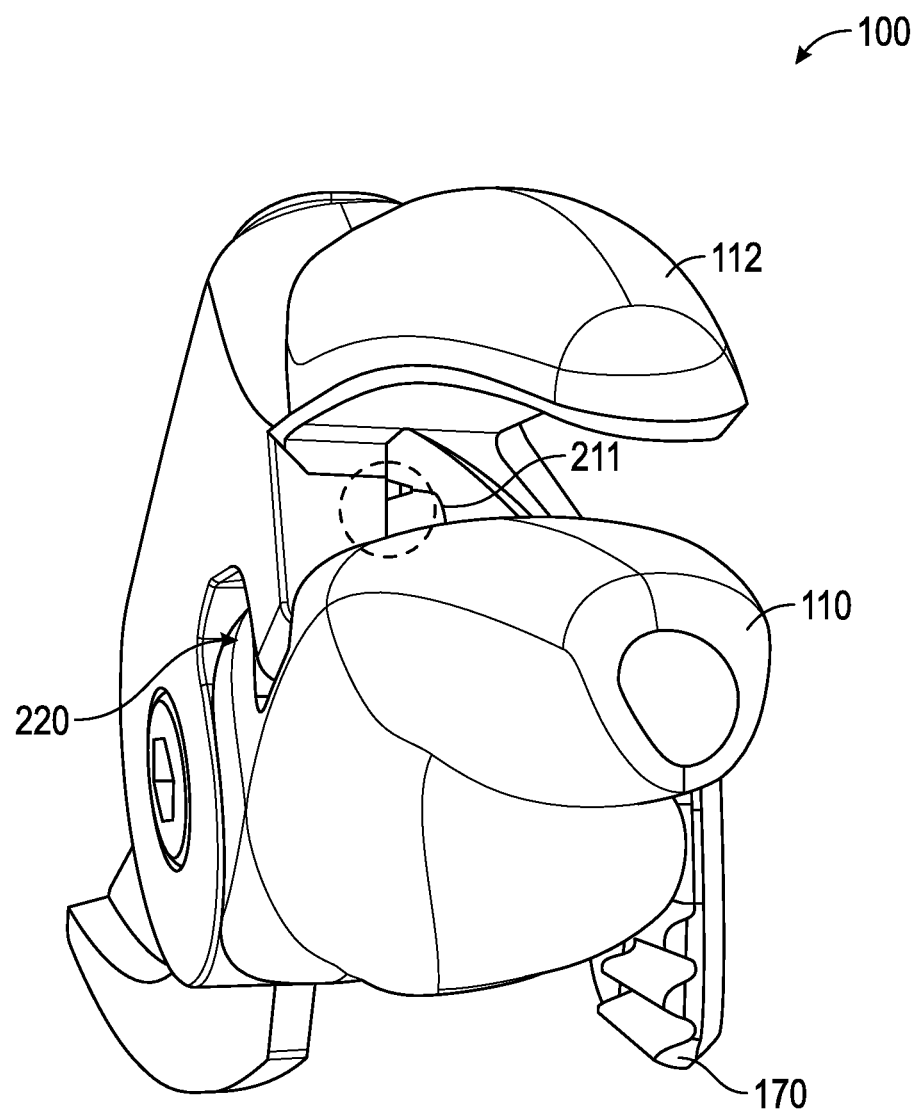

As mentioned above, from the full close position, the gear projections 160 and 170 are engaged during the first region of the cutting stroke. The first handle 110 rotates about the rotation axis 180 while moving upward toward the second handle 112. Now, as the first region transitions to the second region of the cutting stroke, the cam surface 175 and cam follower 165 are engaged as are the first locking projection 205 and the second locking projection 210. In addition, the first and second rotation stops 220 and 225 are also engaged. The interaction between the first and second rotation stops 220 and 225 substantially prevents the handle 110 from rotating any further clockwise about the rotation axis 180. The interaction between the cam surface 175 and the cam follower 165 constrain the movement of the handle 110 along the path 200. The interaction between the locking projections 205 and 210 prevent the handle 110 from rotating counterclockwise during the slide portion of the cutting stroke (i.e., the second region) and constrain the handle 110 to translational movement toward the handle 112. FIG. 8E depicts this interaction (reference numeral 211) where the locking projections 205 and 210 are engaged. Because this constraint of motion restricts travel of the cam follower 165 along a portion of the path 200 during the second region, a consistent engagement and disengagement of the geared projections 160 and 170 occurs.

Figure 19:
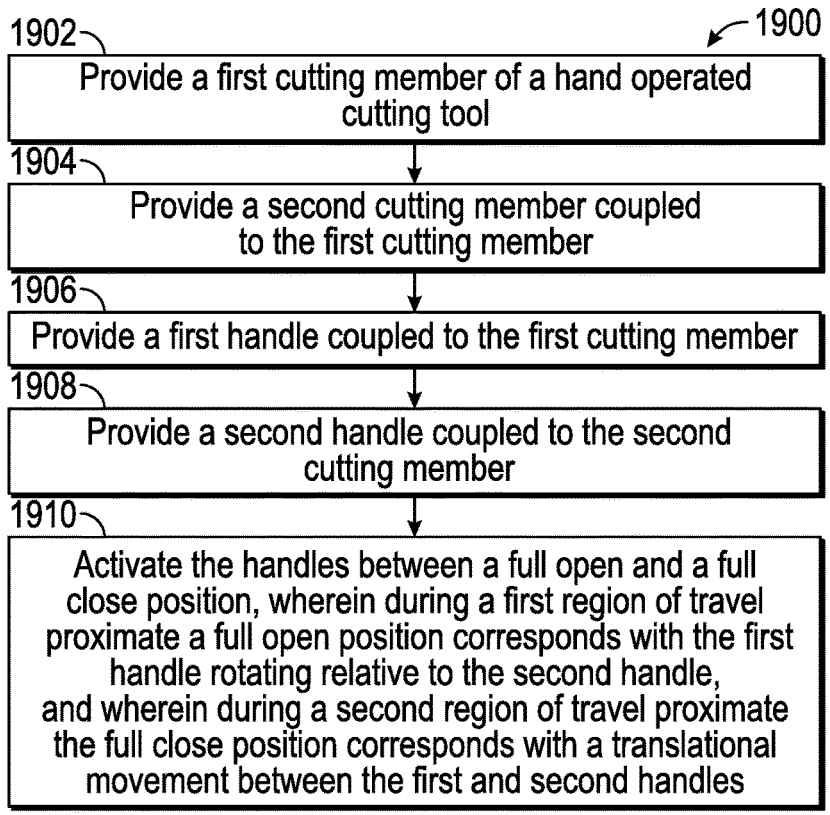
FIG. 19 is a diagram of a method of operating a one-hand operated cutting tool with a variable pivot mechanism, according to an exemplary embodiment.

Referring to FIG. 19, a method 1900 of operating a one-hand operated cutting tool, is shown according to one embodiment. According to one embodiment, method 1900 may be implemented with the cutting tool of FIGS. 5-10B and, as such, may be described in regard to one or more features of that cutting tool. At step 1902, a first cutting member of a hand operated cutting tool is provided. At step 1904, a second cutting member coupled to the first cutting member (e.g., at pivot point 140) is provided. At step 1906, a first handle coupled to the first cutting member is provided. According to one embodiment, the first handle includes a first set of projections (e.g., projections 160). At step 1908, a second handle coupled to the second cutting member is provided. According to one embodiment, the second handle includes a second set of projections (e.g., projections 170). At step 1910, the handles are actuated between a full open and a full close position. During a first region of travel proximate a full open position, the first handle rotates relative to the second handle. During a second region of travel proximate a full close position, a translational movement between the handles occurs. In other words, the second region corresponds with substantial zero rotation of the first handle. According to one embodiment, the first region corresponds with two-thirds of a cutting stroke and the second region corresponds with approximately one-third of a cutting stroke. As described, method 1900 largely corresponds with operation of the one-hand operated cutting tool. Accordingly, in one embodiment, features described in regard to FIGS. 5-10B that are not described in regard to method 1900 may be included in other variations of method 1900 and is intended to fall within the spirit and scope of the present disclosure.

Figure 11:
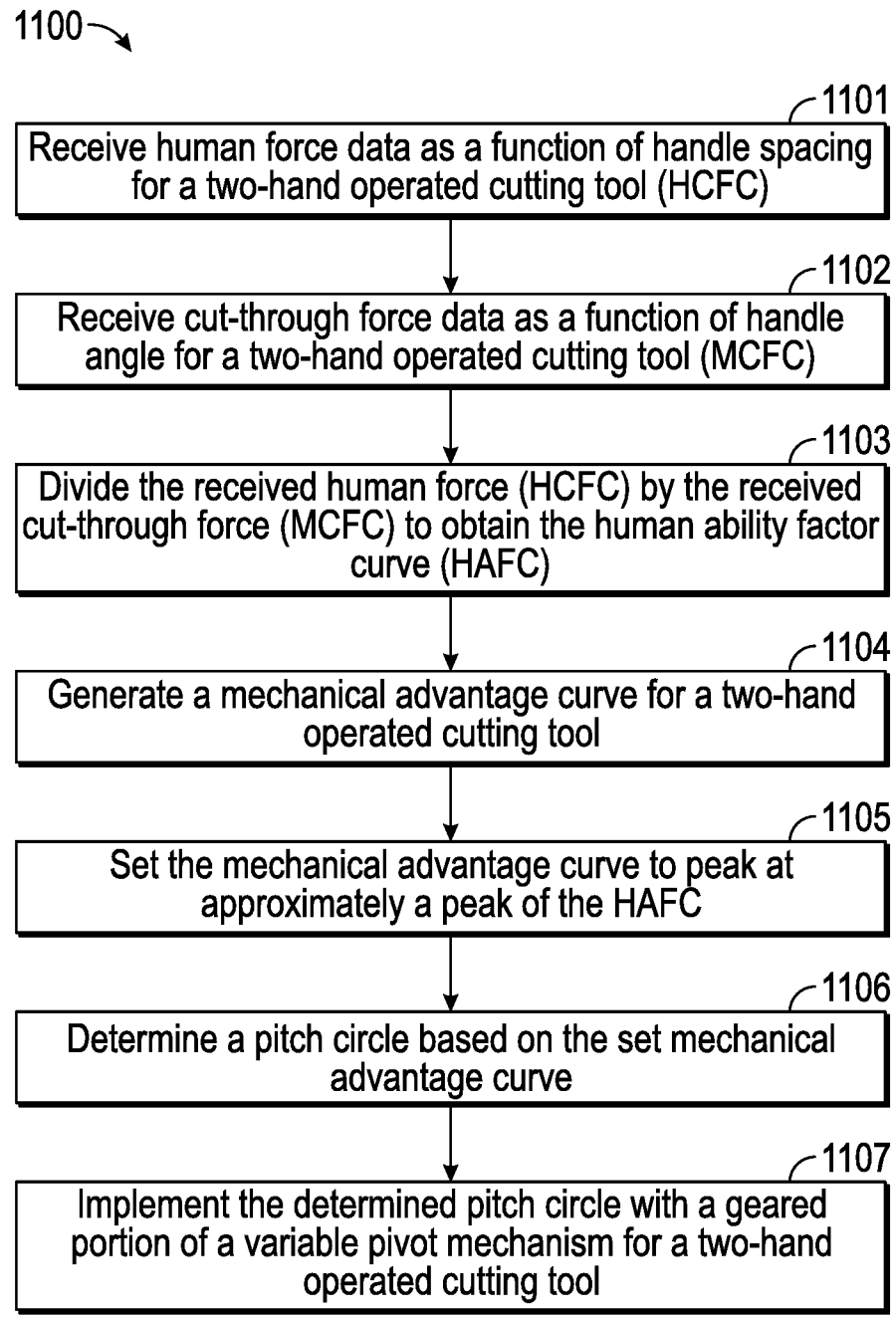
FIG. 11 is a diagram of a method of minimizing effort required to cut through an object using a two-hand operated cutting tool according to an exemplary embodiment.

Referring next to FIG. 11, a method 1100 for minimizing the effort required to cut through an object using a hand operated cutting tool is shown according to an exemplary embodiment. According to one embodiment, method 1100 is implemented with a two-hand operated cutting tool, such as that shown and described with reference to FIGS. 1A-4B above. Accordingly, method 1100 may reference one or more features of the two-hand operated cutting tool of FIGS. 1A-4B to aid explanation of method 1100.

Figure 13:
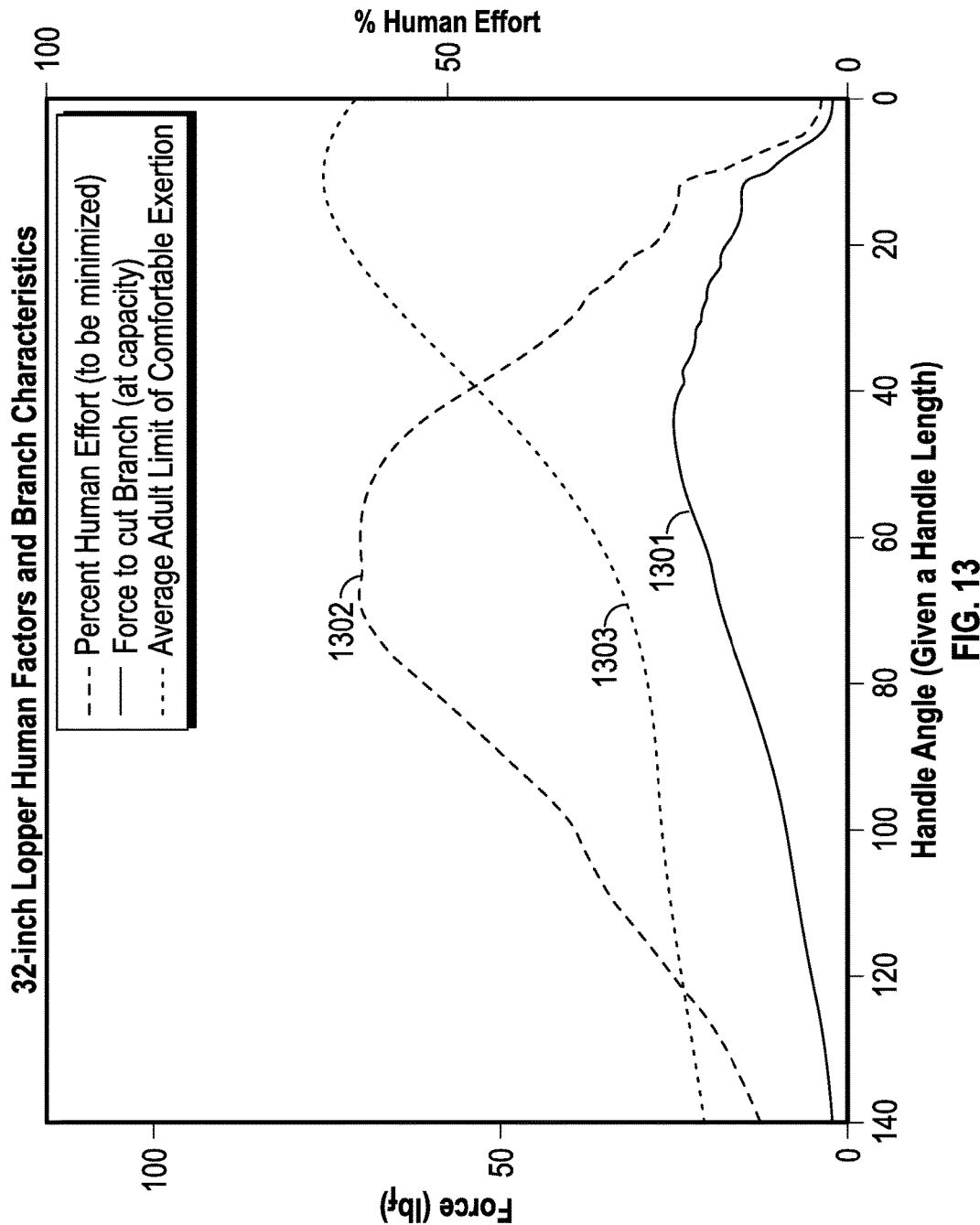
FIG. 13 is a graphical representation of thirty-two inch lopper characteristics as a function of handle angle according to an exemplary embodiment.
Figure 14:
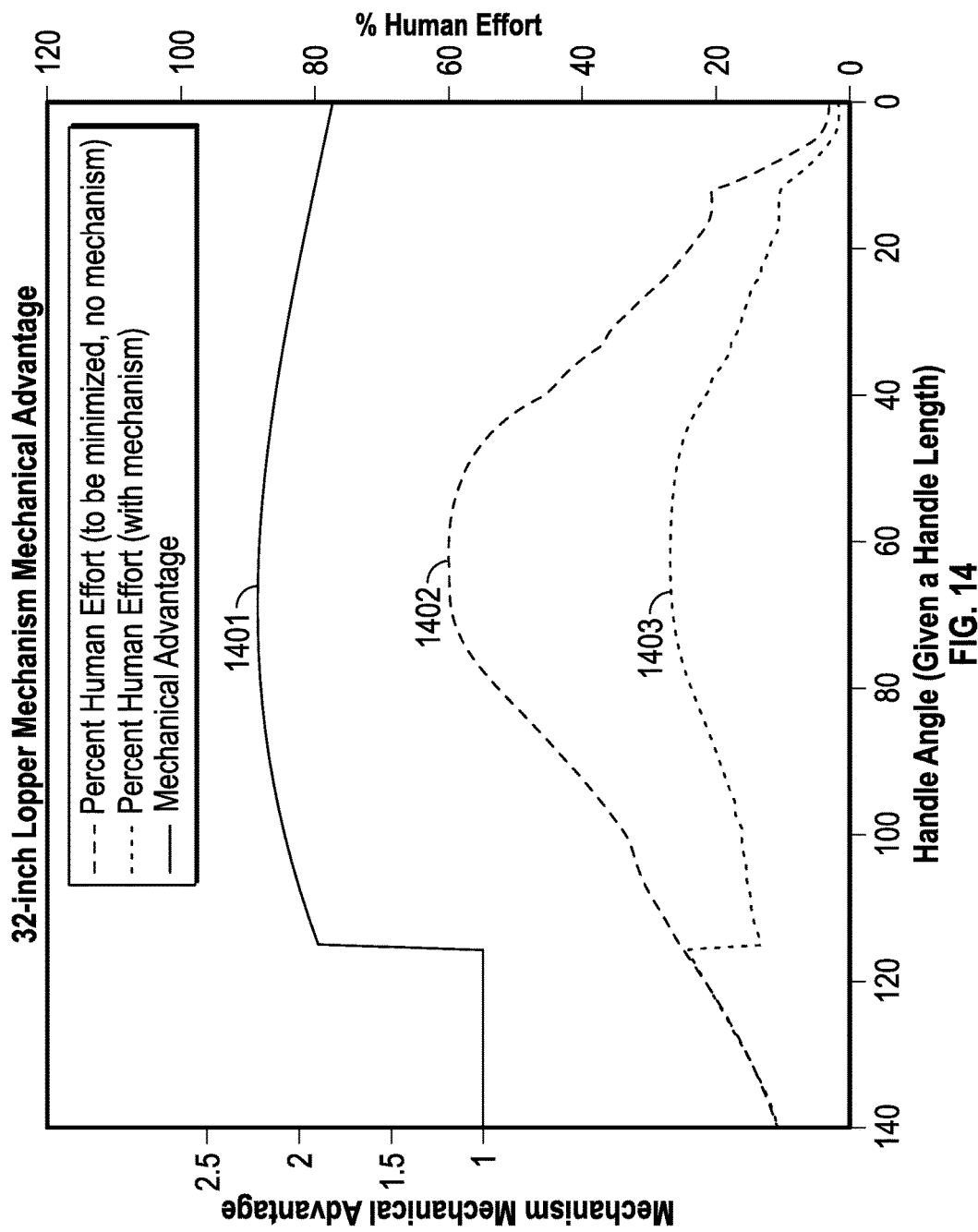
FIG. 14 is a graphical representation of a mechanical advantage curve for a thirty-two inch lopper as a function of handle angle according to an exemplary embodiment.

First, human force data as a function of handle spacing is received (1101). The human force data represents an average maximum force a human can deliver comfortably at various handle spacings. According to one embodiment, the human force data is measured data acquired from a plurality of people. For example, a person may squeeze the handles together (an open position to a close position) at a specific handle angle and the force is measured when the person says or otherwise indicates that this is the force they are comfortable applying albeit they may able to be exert a greater force. In other examples, a true maximum force may be used at step 1101. All such variations are intended to fall within the spirit and scope of the present disclosure. In still other embodiments, the human force data is simulated, estimated, or any generated using any other type of mechanism (e.g., computer modeling software). Second, the cut through force data as a function of handle angle is received (1102). The cut through force data corresponds to a force required to cut through a maximum sized object for the tool at various handle angles. Like the human force data, the cut-through force data may be measured, estimated, simulated, etc. Third, the received human force data is divided by the received cut through force data for a given handle length (1103). By keeping the handle length constant, the division has the same units. Fourth, a mechanical advantage curve is generated (1104). As described below, the mechanical advantage curve may be generated based on one or more constraints (e.g., maximum slope changes in a geared portion of a variable pivot system) and with any type of generation mechanism (e.g., computer simulation software). Fifth, the mechanical advantage curve is set to peak at approximately the same location as the peak of step 1103 (1105). In one embodiment, approximately corresponds with a plus-or-minus ten degree handle angle (e.g., the peak of the mechanical advantage curve may be set to the peak of step 1103 if the peak of the mechanical advantage curve is within a ten degree handle angle of the peak of step 1103). In other embodiments, approximately may correspond with a different handle angle degree than ten degrees (e.g., plus-or-minus five degrees). Based on the set mechanical advantage curve, a pitch circle for the geared portion is determined (1106). According to one embodiment, after determination, the pitch circle is implemented with the two-hand operated cutting tool to reduce the effort required to cut through an object (1107). Method 1100 is more fully described in the following paragraphs with reference to FIGS. 12-14, with FIGS. 12 and 13 depicting graphical representations of steps 1101 and 1102 respectively, and FIG. 14 depicting graphical representations of steps 1104 and 1105.

Figure 12:
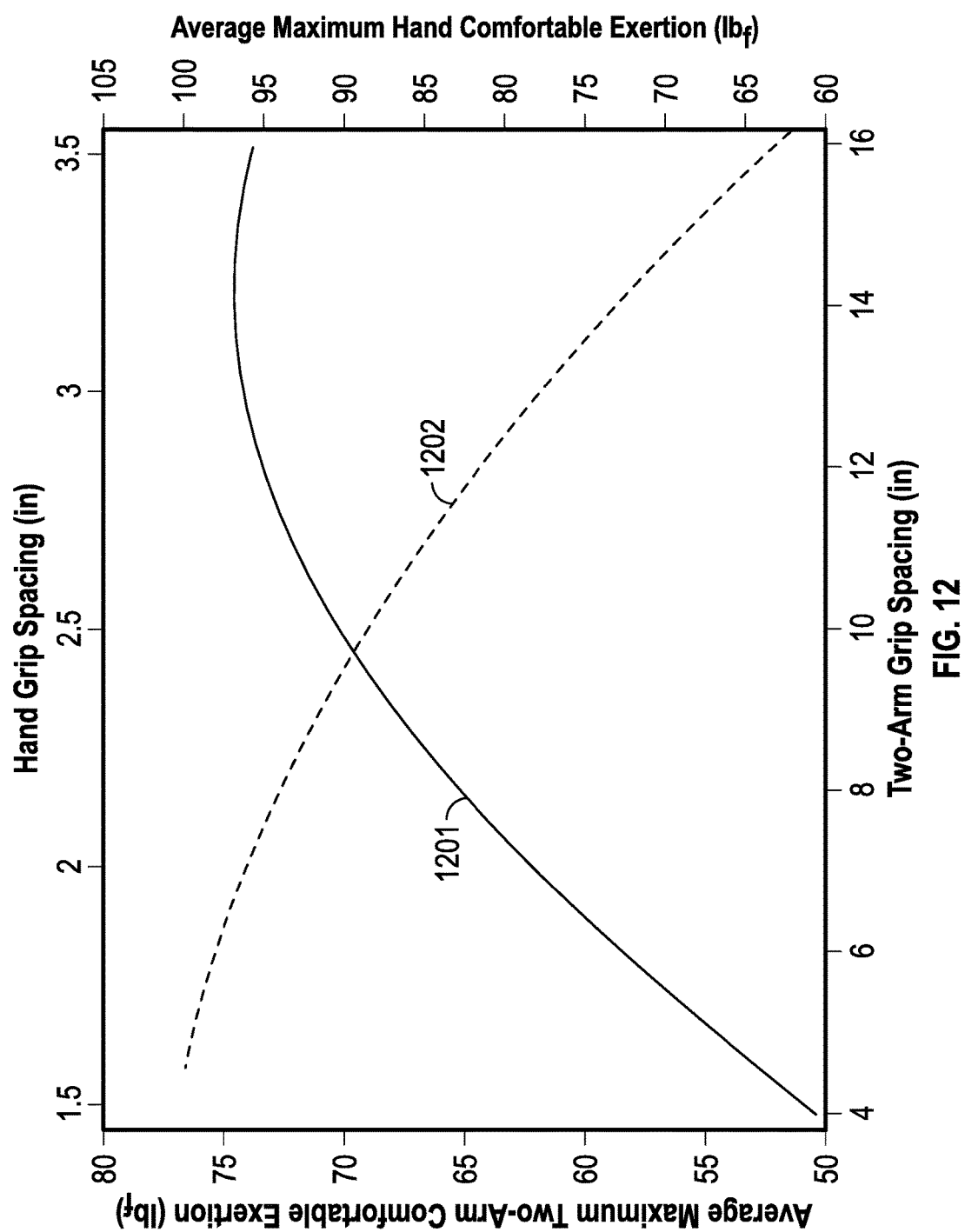
FIG. 12 is a graphical representation of force curve data representing human strength capability as a function of handle spacing for a two-hand operated cutting tool and as a function of hand grip spacing for a one-hand operated cutting tool according to an exemplary embodiment.

Referring to FIG. 12, a graphical representation of force curve data representing human strength capability as a function of handle spacing (i.e., the "two-arm grip spacing" axis legend) for a two-hand operated cutting tool and as a function of handle spacing (i.e., the "hand grip spacing" axis legend) for a one-hand operated cutting tool is shown according to an exemplary embodiment. As mentioned above, FIG. 12 is a graphical representation of step 1101. According to one embodiment, the curves in FIG. 12 represent best-fit lines obtained from measured data. The curves are referred to herein as the Human Capability Force Curves (HCFC) (i.e., a HCFC for a two-hand operated cutting tool (curve 1202) and an HCFC for a one-hand operated cutting tool (curve 1201)). In other embodiments, the data may be simulated or obtained from any other source or type of human force data generating device (e.g., biological simulation software in a computer). As mentioned above and in the embodiment depicted, the HCFCs represent a maximum comfortable exertion force. For example, a person may indicate a maximum comfortable exertion at a specific of hand grip spacing (for one-hand operated cutting tool) and two-arm grip spacing (for two-hand operated cutting tool). When that person indicates they are at their maximum comfortable exertion, the corresponding force may be measured (e.g., via a strain gauge or other force measuring mechanism) and recorded as a data point for that person. This process may be repeated for a plurality of persons over a range of hand grip and two-arm grip spacings for each person. Each data point for each person at each hand grip spacing or two-arm grip spacing may then be averaged (in other embodiments, a median value or other representative value may be used) with a best fit line applied to create the HCFC. In other embodiments, a true maximum force may be used rather than a maximum comfortable exertion force. In still other embodiments, a near minimum force may be used (in that regard, the pitch circles may be optimized for individuals who may be able to exert a relatively lower force). In each case, the same process as described above may be used to create a HCFC. Accordingly, all such variations are intended to fall within the spirit and scope of the present disclosure.

As shown, in regard to a two-hand operated cutting tool, as the user's hands become closer, the force that a user can deliver to the handles of a two-hand operated cutting tool typically decreases (curve 1201). In comparison, in regard to a one-hand operated cutting tool, as the grip spacing decreases, the force that a user can deliver typically increases (curve 1202). Thus, force delivery characteristics for a one-hand operated cutting tool and a two-hand operated cutting tool are nearly direct opposites of each other.

This is shown by the nearly oppositely sloped curves 1201, 1202 in FIG. 12. For this reason, the variable pivot mechanism operates opposite for a two-hand operated cutting tool to that of a one-hand operated cutting tool. Accordingly, each tool utilizes a unique human strength capability curve in order to minimize the effort required to cut through an object.

Referring now to FIG. 13, thirty-two inch handle length lopper characteristics as a function of handle angle for a constant handle length is shown, according to an exemplary embodiment. Curve 1301 represents a Material Cut Force Curve (MCFC) for a thirty-two inch lopper, according to an exemplary embodiment. In one embodiment, curve 1302 corresponds with step 1102 of method 1100. Whereas the HCFC is from the standpoint of the user, curve 1301 is from the standpoint of the object to be cut. Curve 1301 represents the force needed to cut through a maximum sized object for the cutting tool at various handle angles. An example creation of curve 1301 may be as follows. A plurality of maximum sized objects may be assembled and cut by the lopper. The force may be measured (e.g., via a strain gauge) and recorded over the cutting stroke (e.g., via from a maximum handle angle to a minimum handle angle). Utilizing the force curve data for a plurality of maximum sized objects, at each handle angle, the corresponding force curve data points may be averaged (or, a maximum value, a minimum value, a standard deviation value, etc.) and plotted. After plotting, a best fit line may be applied to the cut-through force data to create the MCFC. In other embodiments, other curve fitting techniques may be used to create the MCFC, and the other curves described herein. In the example shown, at an approximate sixty-degree handle angle, the force to cut through the object is maximized. Because the fibers in an object are typically compressible, the object compresses from the shearing force by the two cutting members prior to the maximum resistance being encountered to actually cut through the object.

Still referring to FIG. 13, curve 1303 represents an average adult limit of comfortable exertion (e.g., force and/or effort) at various handle angles for a constant handle length. Because the HCFC is a function of handle spacing and the MCFC is a function of handle angle, if the handle length stays constant, dividing HCFC (i.e., curve 1303, which is generated based on a constant handle length) by the MCFC yields the Human Ability Factor Curve, "HAFC," (curve 1302) (corresponding to step 1103 of method 1100). Because the HCFC represents the maximum human force at a given grip spacing and the amount of force required to cut through an object may be less than that maximum force, the HAFC represents a percent of strength (i.e., effort) as a function of position that a user needs to exert in order to make the cut through the object.

Referring to FIG. 14, a graphical representation of mechanical advantage as a function of blade angle for a two-hand operated cutting tool with a variable pivot system is shown, according to an exemplary embodiment. The mechanical advantage curve 1401 was generated by adherence to the constraints of the variable pivot system and the, in this example, constraints of the thirty-two inch lopper (step 1104). For example, such constraints include human and physical limitations, such as a maximum handle-opening angle, a handle length, and a geometric and cut-capacity limitation of the object to be cut (i.e., a maximum sized object as a cutting subject for the tool). Moreover, there are maximum slope changes that can be used with the geared portion of the variable pivot system. Accordingly, by adhering to these constraints, the depicted mechanical advantage curve was created. Because of the variable pivot system, the flat line section in the mechanical advantage curve represents the single pivot portion whereas the curved section represents the geared portion of the variable pivot system. According to one embodiment, the mechanical advantage curve may be generated based on an iterative process. For example, a mechanical advantage curve is designed and then one associated gear-tooth geometry (using a variation on the involute gear-profile) is constructed. Next, the designed mechanical advantage curve is used to "cut" the mating gear. This process establishes the parameter windows that are mechanically feasible and robust (e.g., the constraints of the system). The pitch circles are a geometric derivative of the mechanical advantage curve (i.e., step 1106).

In this embodiment, the slide portion of the variable pivot mechanism corresponds with a handle angle of approximately 140 degrees to 115 degrees, where approximately refers to plus-or-minus ten degrees. Comparatively, the geared portion corresponds with a handle angle of approximately 115 degrees to 0 degrees. In other embodiments, based on the constraints of the cutting tool, the approximate handle angles for each portion—geared and slide—may vary (e.g., the geared portion may correspond with a handle angle of approximately 115 degrees to 5 degrees). For example, a twelve inch lopper may have a full open handle angle of approximately ninety degrees. In this example, the slide portion may correspond with 90 degrees to 60 degrees and the geared portion corresponds with 60 degrees to 0 degrees, where approximately is plus-or-minus 5 degrees. As mentioned above, according to one embodiment, the geared portion may correspond with two-thirds of a cutting stroke while the slide portion corresponds with one-third of the cutting stroke. While the exact handle angle delineations may differ based on the application, it should be understood that method 1100 with the graphs shown and described herein are still substantially applicable to those applications. In turn, all such variations are intended to fall within the spirit and scope of the present disclosure.

As shown in FIG. 14, the peak of the mechanical advantage curve 1401 is set to approximately the peak of the HAFC 1402 (step 1105). As mentioned above, "approximately" may differ based on the cutting tool this method is being utilized with. In one embodiment, approximately corresponds to a plus-or-minus ten degree handle angle. In other embodiments, a different value may be used (e.g., a plus-or-minus five degree handle angle). Note that this location may be different than the peak location of the MCFC and that this is typically an iterative process. A pitch circle is determined using the mechanical advantage curve that peaks at approximately where the HAFC peaks (step 1106).

The determined pitch circles are then implemented in, for example, the lopper of FIGS. 1A-4B (i.e., step 1107). As mentioned above, in one embodiment, the determined pitch circles are at least partially elliptical. At each blade angle, the geared portion is configured to deliver approximately the mechanical advantage derived and represented in FIG. 14 (for the thirty-two inch lopper). The determined pitch circles are based in part on the HAFC, i.e., the percent of strength (effort) a user is exerting to make the cut through an object. As such, due to the geared portion of the variable pivot system, the resultant effort is lower than the otherwise required human effort to cut through an object without the geared mechanism. The resultant effort curve is represented in FIG. 14 as curve 1403. In turn, as described, the determined pitch circles for the geared portion are optimized to minimize human effort in operating the hand operated cutting tool. This feature may appeal to customers, which may lead to an increase in sales potential.

Figure 15:
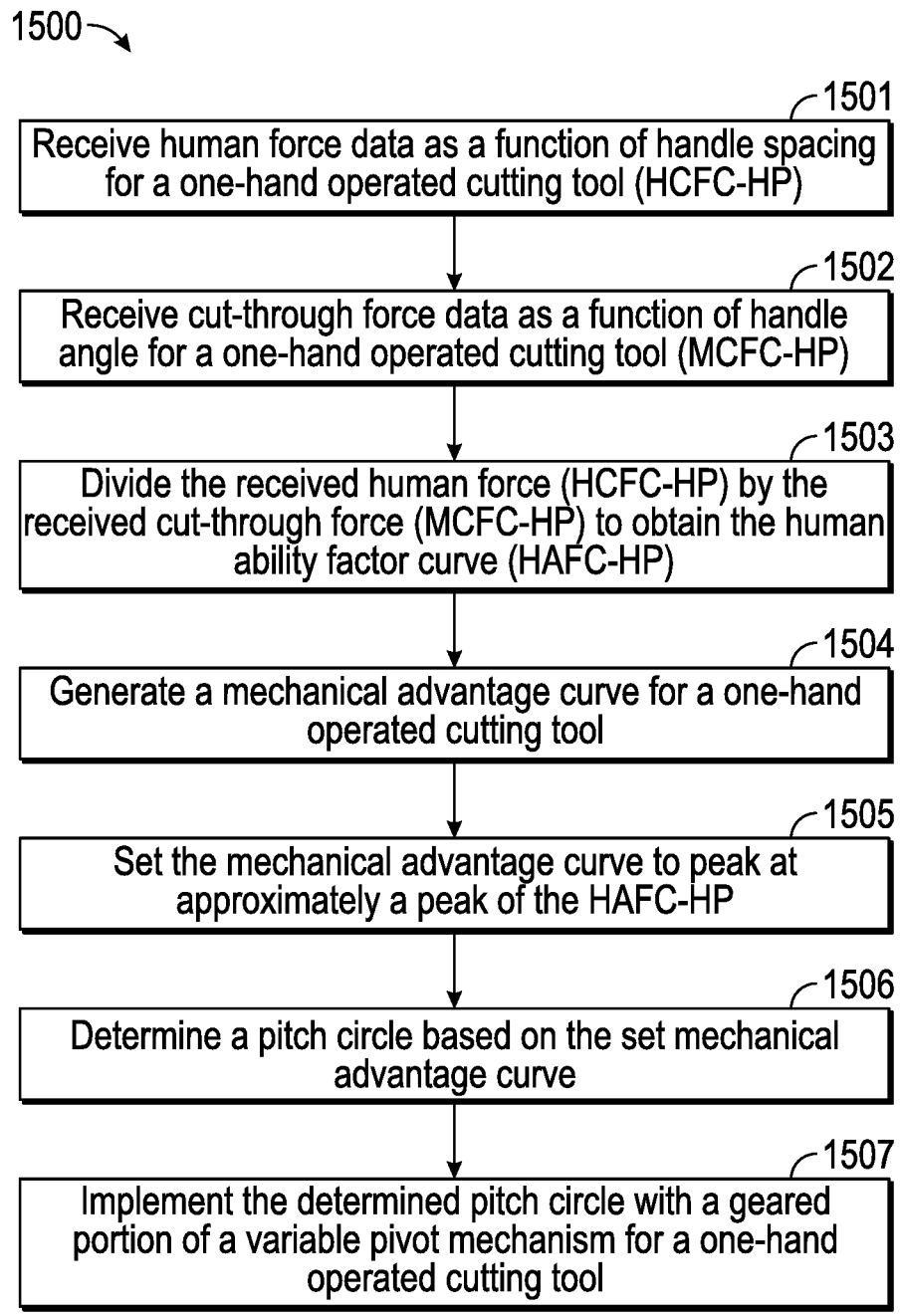
FIG. 15 is a diagram of a method of minimizing effort required to cut through an object using a one-hand operated cutting tool according to an exemplary embodiment.

Referring next to FIG. 15, a method 1500 for minimizing the effort required to cut through an object using a one-hand operated cutting tool, such as that shown and described with reference to FIGS. 5-10B and 19 above is illustrated according to an exemplary embodiment. Method 1500 is substantially similar to method 1100 and, in turn, is briefly described. The difference between method 1500 and method 1100 is that method 1500 is for a one-hand operated cutting tool. More nuanced differences are explained and shown in regard to FIGS. 16-17.

First, human force data as a function of handle spacing is received (1501). The human force data represents an average maximum force a human can deliver comfortably at various handle spacings. According to one embodiment, the human force data is measured data acquired from a plurality of people. For example, a person may squeeze the handles together (an open position to a close position) at a specific handle angle and the force is measured when the person says or otherwise indicates that this is the force they are comfortable applying albeit they may able to be exert a greater force. In other examples, a true maximum force may be used at step 1501. All such variations are intended to fall within the spirit and scope of the present disclosure. In still other embodiments, the human force data is simulated, estimated, or any generated using any other type of mechanism (e.g., computer modeling software). Second, the cut through force data as a function of handle angle is received (1502). The cut through force data corresponds to a force required to cut through a maximum sized object for the tool at various handle angles. Like the human force data, the cut-through force data may be measured, estimated, simulated, etc. Third, the received human force data is divided by the received cut through force data for a given handle length (1503). By keeping the handle length constant, the division has the same units. Fourth, a mechanical advantage curve is generated (1504). As described below, the mechanical advantage curve may be generated based on one or more constraints (e.g., maximum slope changes in a geared portion of a variable pivot system) and with any type of generation mechanism (e.g., computer simulation software). Fifth, the mechanical advantage curve is set to peak at approximately the same location as the peak of step 1503 (1505). In one embodiment, approximately corresponds with a plus-or-minus three degree handle angle (e.g., the peak of the mechanical advantage curve may be set to the peak of step 1503 if the peak of the mechanical advantage curve is within a three degree handle angle of the peak of step 1503). Relative to the two-hand operated cutting tool, in general, the one-hand operated cutting tool has a relative smaller full open separating angle between the handle. As such, the "approximate" designation is smaller. In one embodiment, full open corresponds with a handle angle (e.g., angle 280) of approximately 30 degrees. In this embodiment, the first region of travel corresponds with a handle angle of approximately 30 degrees to 5 degrees and the second region of travel corresponds with a handle angle of approximately 5 degrees to a full close position (e.g., 0 degrees). It should be understood, however, in other embodiments, approximately may correspond with a different handle angle degree than 3 degrees (e.g., plus-or-minus one degrees). Based on the set mechanical advantage curve, a pitch circle for the geared portion is determined (1506). According to one embodiment, after determination, the pitch circle is implemented with the one-hand operated cutting tool to reduce the effort required to cut through an object (1507).

As mentioned above in regard to FIG. 12, for a one-hand operated cutting tool, as the grip spacing decreases (i.e., angle 280 between the handles), the force that a user can deliver typically increases. In regard to the paragraphs that follow, this curve is referred to as the HCFC-HP (i.e., human capability force curve-hand pruner). As mentioned before, force delivery characteristics for a one-hand operated cutting tool and a two-hand operated cutting tool are nearly direct opposites of each other. Accordingly, each tool utilizes a unique human strength capability curve in order to minimize the effort required to cut through an object.

Figure 16:
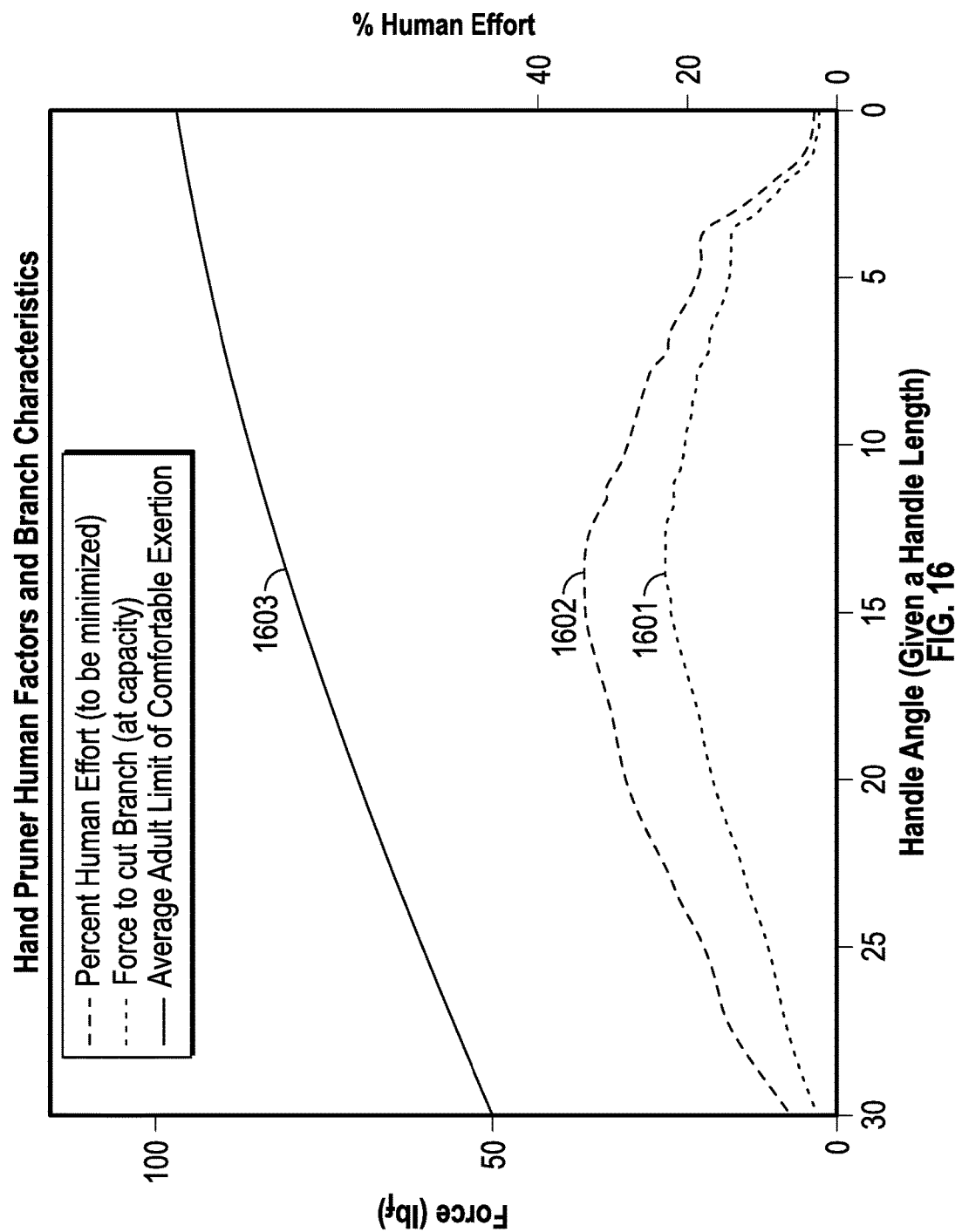
FIG. 16 is a graphical representation of hand pruner characteristics as a function of handle angle according to an exemplary embodiment.

Referring to FIG. 16, human characteristics of a hand pruner of given handle length are shown, according to an exemplary embodiment. Curve 1601 represents a Material Cut Force Curve (MCFC-HP (hand pruner)) for a hand pruner, according to an exemplary embodiment. In one embodiment, curve 1602 corresponds with step 1502 of method 1500. Whereas the HCFC-HP is from the standpoint of the user, curve 1601 is from the standpoint of the object to be cut. Curve 1601 represents the force needed to cut through a maximum sized object for the cutting tool at various handle angles. An example creation of curve 1601 may be as follows. A plurality of maximum sized objects may be assembled and cut by the pruner. The force may be measured (e.g., via a strain gauge) and recorded over the cutting stroke (e.g., via from a maximum handle angle to a minimum handle angle). Utilizing the force curve data for a plurality of maximum sized objects, at each handle angle, the corresponding force curve data points may be averaged (or, a maximum value, a minimum value, a standard deviation value, etc.) and plotted. After plotting, a best fit line may be applied to the cut-through force data to create the MCFC-HP. In other embodiments, other curve fitting techniques may be used to create the MCFC-HP, and the other curves described herein.

Still referring to FIG. 16, curve 1603 represents an average adult limit of comfortable exertion (e.g., force and/or effort) at various handle angles for a constant handle length. Because the HCFC-HP is a function of handle spacing and the MCFC-HP is a function of handle angle, if the handle length stays constant, dividing HCFC-HP (i.e., curve 1603, which is generated based on a constant handle length) by the MCFC-HP yields the Human Ability Factor Curve, "HAFC-HP," (curve 1602) (corresponding to step 1503 of method 1500). Because the HCFC-HP represents the maximum human force at a given grip spacing and the amount of force required to cut through an object may be less than that maximum force, the HAFC-HP represents a percent of strength (i.e., effort) as a function of position that a user needs to exert in order to make the cut through the object.

Figure 17:
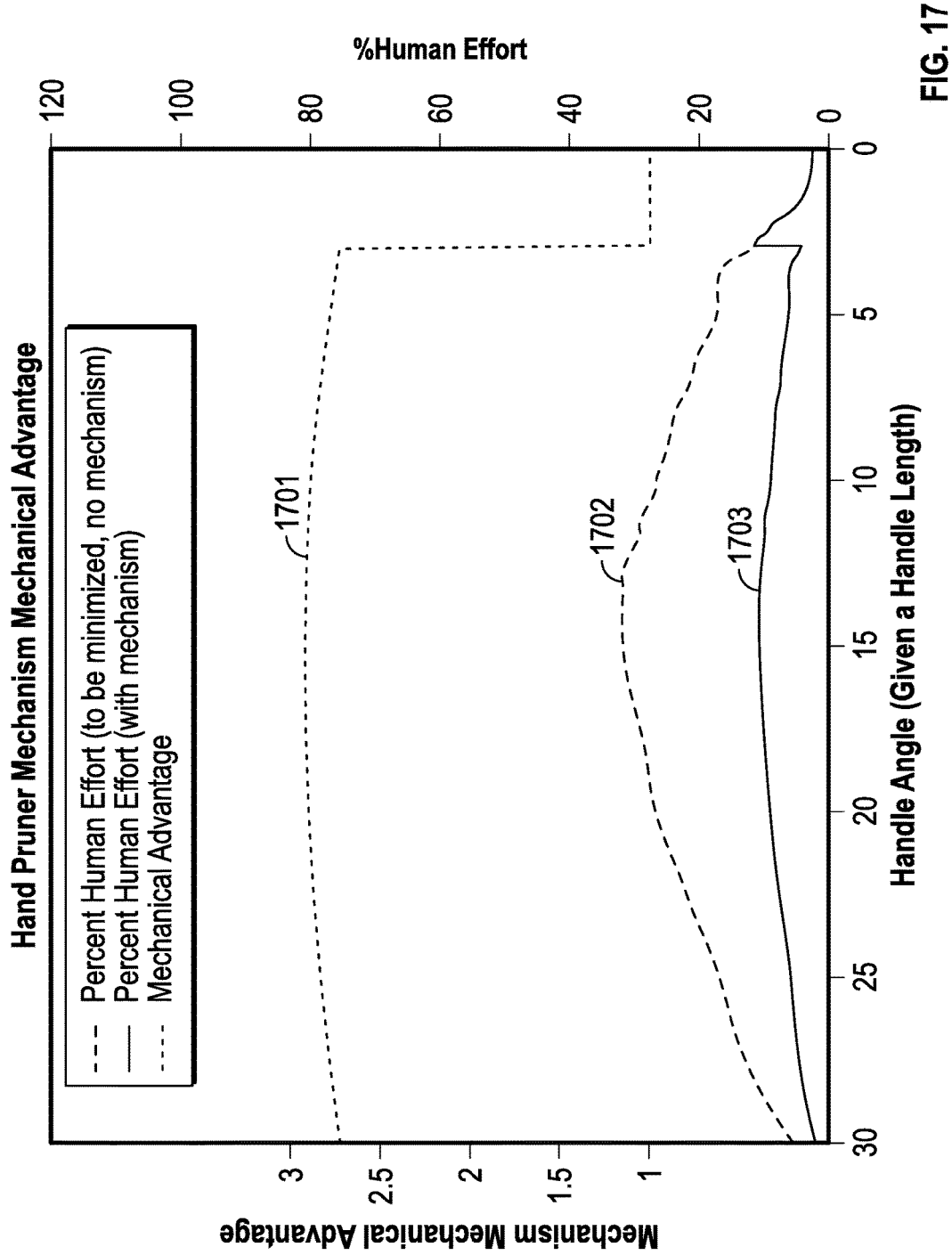
FIG. 17 is a graphical representation of a mechanical advantage curve for a hand pruner as a function of handle angle according to an exemplary embodiment.

Referring next to FIG. 17, a graphical representation of mechanical advantage as a function of blade angle for a one-hand operated cutting tool with a variable pivot system is shown according to an exemplary embodiment. The mechanical advantage curve 1701 was generated by adherence to the constraints of the variable pivot system and the, in this example, constraints of the hand pruner (one-hand operated cutting tool) (step 1504). For example, such constraints include human and physical limitations, such as a maximum handle-opening angle, a handle length, and a geometric and cut-capacity limitation of the object to be cut (i.e., a maximum sized object as a cutting subject for the tool). Moreover, there are maximum slope changes that can be used with the geared portion of the variable pivot system. Accordingly, by adhering to these constraints, the depicted mechanical advantage curve was created. Because of the variable pivot system, the flat line section in the mechanical advantage curve represents the single pivot portion whereas the curved section represents the geared portion of the variable pivot system. As shown, the first region (geared portion) corresponds to a relatively greater mechanical advantage than the second region (slide portion) of the cutting stroke. Like the example mentioned above, the first region of travel for the one-hand operated cutting tool with the variable pivot system corresponds with a handle angle of approximately 30 degrees to approximately 5 degrees, and the second region of travel corresponds with a handle angle of approximately 5 degrees to a full close position (e.g., 0 degrees). Accordingly, in this case, the first region (geared portion) is approximately eighty percent of the cutting stroke (30 degree full open angle and 25 degrees corresponds with the first region). In other embodiments, the first region may be two-thirds of the cutting stroke relative to one-third of the second region. In still other embodiments, the delineation may vary (e.g., 50-50, 25-50, etc.). This is also true of the two-hand operated cutting tool despite being primarily described in regard to a ⅔-⅓ split. All such variations are intended to fall within the spirit and scope of the present disclosure.

As shown in FIG. 17, the peak of the mechanical advantage curve 1701 is set to approximately the peak of the HAFC-HP 1702 that represents the HAFC-HP with the variable pivot mechanism (step 1505). As mentioned above, "approximately" may differ based on the cutting tool this method is being utilized with. In one embodiment, approximately corresponds to a plus-or-minus three degree handle angle. In other embodiments, a different value may be used (e.g., a plus-or-minus five degree handle angle). Note that this location may be different than the peak location of the MCFC-HP and that this is typically an iterative process. A pitch circle is determined using the mechanical advantage curve that peaks at approximately where the HAFC-HP peaks (step 1506).

The determined pitch circles are then implemented in, for example, the hand pruner of FIGS. 5-10B (i.e., step 1507). Therefore, at each blade angle, the geared portion is configured to deliver approximately the mechanical advantage derived and represented in FIG. 17. The determined pitch circles are based in part on the HAFC-HP, i.e., the percent of strength (effort) a user is exerting to make the cut through an object. As such, due to the geared portion of the variable pivot system, the resultant effort (curve 1703) is lower than the otherwise required human effort to cut through an object without the geared mechanism (curve 1702). Please note that this curve will change and in turn the pitch circles for various hand tools that utilize the described variable pivot system.

It is important to note that the construction and arrangement of the elements of the hand operated cutting tool, shown as a lopper and a pruner, with a variable pivot system shown schematically in the embodiments is illustrative only. Although only a few embodiments have been described in detail in this disclosure, those skilled in the art who review this disclosure will readily appreciate that many modifications are possible without materially departing from the novel teachings and advantages of the subject matter recited.

Accordingly, all such modifications are intended to be included within the scope of the present disclosure. Other substitutions, modifications, changes and omissions may be made in the design, operating conditions and arrangement of the preferred and other exemplary embodiments without departing from the spirit of the present disclosure. For example, the shape and position of the guide member plate may be varied as necessary to accommodate changes in the dimensions, shape and geometry of the other components of the cutting tool. Also, the type and positions of the locking devices (e.g., travel stop and cam follower) may further be varied to accommodate changes in other components of the cutting tool. Furthermore, the handles extending from the first cutting member and the lever may be of any suitable size and shape to correspond to the specific type of cutting devices and type of cutting tool (e.g. loppers, shears, pruners, trimmers, etc.). Moreover, for example, the type and positions of locking projections for the one-hand operated cutting tool may be varied to accommodate changes in other components of the cutting tool.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present disclosure as expressed in the appended claims.

What is claimed is:

1. A hand operated cutting tool, comprising:
    a first handle rotatably coupled to a first cutting member, the first handle having a first set of projections; and
    a second handle coupled to a second cutting member, the second handle having a second set of projections, the second handle movably coupled to the first handle;
    wherein the handles are movable between a full open position and a full closed position, wherein during a movement from the full open position to the full closed position the first and second sets of projections at least partly engage such that the first handle rotates relative to the first cutting member.

2. The hand operated cutting tool of claim 1, wherein during a first region of the movement proximate the full open position the first and second sets of projections are at least partly engaged, and wherein during a second region of the movement proximate the full closed position the first and second sets of projections are disengaged.

3. The hand operated cutting tool of claim 2, wherein the first handle rotates during the first region of the movement and transitions to a translation motion during the second region of the movement.

4. The hand operated cutting tool of claim 2, further comprising:
    a first rotation stop coupled to the first handle;
    a second rotation stop coupled to the first cutting member;
    a first locking projection coupled to the first handle; and
    a second locking projection coupled to the second handle.

5. The hand operated cutting tool of claim 4, wherein during the second region of the movement, the first rotation stop and second rotation stop are engaged and the first locking projection and the second locking projection are engaged to substantially prevent a rotation of the first handle.

6. The hand operated cutting tool of claim 1, wherein the rotatable coupling of the first handle to the first cutting member is defined by a pivot pin of the first handle structured to fit in a bore of the first cutting member.

7. The hand operated cutting tool of claim 1, wherein the second handle includes an elongated member, wherein the elongated member at least partially overlays the first handle throughout the movement from the full open position to the full closed position, and wherein the second set of projections are positioned on an interior surface of the elongated member proximate the first handle.

8. The hand operated cutting tool of claim 1, wherein the second handle moves in a translation motion throughout the movement.

9. The hand operated cutting tool of claim 1, wherein the first and second sets of projections are structured as gear projections.

10. The hand operated cutting tool of claim 1, wherein the hand operated cutting tool is configured as a pruner.

11. A hand operated cutting tool, comprising:
a first handle having a pivot pin, a cam follower, and a first gear projection;
a first cutting member having a bore, wherein the bore is structured to receive the pivot pin to rotatably couple the first handle to the first cutting member; and
a second handle having a second cutting member and an elongated member, wherein the elongated member has a cam surface and a second gear projection, and wherein the second handle is movably coupled to the first handle;
wherein the handles are movable between a full open position and a full closed position to define a cutting stroke, wherein during a movement from the full open position to the full closed position the first gear projection and the second gear projection at least partly engage such that the first handle rotates relative to the first cutting member.

12. The hand operated cutting tool of claim 11, wherein during a first region of the movement proximate the full open position of the cutting stroke the first and second gear projections are at least partly engaged, and wherein during a second region of the movement proximate the full closed position of the cutting stroke the cam follower and the cam surface are engaged while the first and second gear projections are disengaged.

13. The hand operated cutting tool of claim 12, wherein the first region of the movement defines approximately two-thirds of the cutting stroke and the second region of the movement defines approximately one-third of the cutting stroke.

14. The hand operated cutting tool of claim 12, wherein the first region of the movement corresponds with a relatively greater amount of mechanical advantage than the second region of the movement.

15. The hand operated cutting tool of claim 12, wherein during the first region of the movement, a handle angle between the first and second handles changes from approximately 30 degrees to 5 degrees, and wherein during the second region of the movement the handle angle between the first and second handles changes from approximately 5 degrees to 0 degrees.

16. The hand operated cutting tool of claim 12, wherein the first handle rotates about a rotation axis defined by the pivot pin and bore during the first region of the movement and transitions to a translation motion during the second region of the movement.

17. The hand operated cutting tool of claim 12, wherein the cam surface is positioned directly above the second gear projection on the elongated member, such that an interaction between the first and second gear projections in the first region of the movement and a transition to an interaction of the cam surface and cam follower in the second region of the movement occurs along a continuous path defined by the elongated member.

18. The hand operated cutting tool of claim 11, wherein the first and second gear projections have either an at least partially elliptical pitch or a circular pitch.

19. The hand operated cutting tool of claim 11, further comprising a biasing member coupled to the first and second handles, the biasing member configured to bias the handles in the full open position.

20. The hand operated cutting tool of claim 11, wherein the second handle includes a locking device configured to lock the handles in the full closed position.

21. A method for operating a hand operated cutting tool, comprising:
providing a first cutting member;
providing a second cutting member coupled to the first cutting member;
providing a first handle rotatable coupled to the first cutting member, the first handle having a first set of projections; and
providing a second handle coupled to the second cutting member, the second handle having a second set of projections, wherein the second handle is movably coupled to the first handle;
wherein during a cutting stroke, the first and second handles are movable between a full open position and a full close position;
wherein during a movement from the full open position to the full close position, the first and second sets of projections at least partly engage and the first handle rotates relative to the first cutting member.

22. The method of claim 21, wherein during a first region of the movement proximate the full open position the first and second sets of projections are at least partly engaged, and wherein during a second region of the movement proximate the full closed position the first and second sets of projections are disengaged.

23. The method of claim 22, wherein the first region of the movement defines approximately two-thirds of the cutting stroke and the second region of the movement defines approximately one-third of the cutting stroke.

* * * * *